United States Patent [19]

Beck

[11] Patent Number: 5,392,745
[45] Date of Patent: Feb. 28, 1995

[54] EXPANDING CLOUD FUEL INJECTING SYSTEM

[75] Inventor: Niels J. Beck, Bonita, Calif.

[73] Assignee: Servojet Electric Systems, Ltd., San Diego, Calif.

[21] Appl. No.: 227,868

[22] Filed: Apr. 18, 1994

Related U.S. Application Data

[63] Continuation of Ser. No. 5,404, Jan. 19, 1993, abandoned, which is a continuation of Ser. No. 613,933, Nov. 13, 1990, abandoned, which is a continuation of Ser. No. 410,031, Sep. 20, 1989, abandoned, which is a continuation of Ser. No. 198,668, May 25, 1988, abandoned, which is a continuation of Ser. No. 16,773, Feb. 20, 1987, abandoned.

[51] Int. Cl.$^6$ ............................................. F02B 3/08
[52] U.S. Cl. ................................... 123/295; 123/305
[58] Field of Search .............. 123/295, 299, 305, 294, 123/304, 447

[56] References Cited

U.S. PATENT DOCUMENTS

| | | | |
|---|---|---|---|
| 1,644,557 | 10/1927 | Banner | 123/299 |
| 1,683,752 | 9/1928 | Banner | 123/299 |
| 1,897,290 | 2/1933 | Wuterich | 123/447 |
| 1,963,578 | 6/1934 | Dorner | 123/299 |
| 2,985,378 | 7/1960 | Falberg | 239/96 |
| 3,033,182 | 5/1962 | Allen | 123/447 |
| 3,154,059 | 10/1964 | Witzky et al. | 123/295 |
| 3,391,871 | 7/1968 | Fleischer et al. | 123/299 |
| 3,892,208 | 7/1975 | Anderson et al. | 123/295 |
| 4,052,973 | 10/1977 | Clauser | 123/295 |
| 4,200,231 | 4/1980 | Knape | 239/533.9 |
| 4,216,745 | 8/1980 | Latter et al. | 123/295 |
| 4,284,043 | 8/1981 | Happel | 123/299 |
| 4,286,557 | 9/1981 | Klomp | 123/295 |
| 4,401,071 | 8/1983 | Zürner et al. | 123/295 |
| 4,414,940 | 11/1983 | Loyd | 123/299 |
| 4,473,046 | 9/1984 | Aoyama et al. | 123/294 |
| 4,548,172 | 10/1985 | Bailey | 123/299 |
| 4,566,416 | 1/1986 | Berchtold | 123/458 |
| 4,628,881 | 12/1986 | Beck et al. | 123/447 |
| 4,753,213 | 6/1988 | Schlunke et al. | 123/305 |

OTHER PUBLICATIONS

Ralph J. Hooker, ORION, A *Gas-Generator Turbocompound Engine*, vol. 65, 1957, pp. 293–330 (month unknown).

*Primary Examiner*—Andrew M. Dolinar
*Attorney, Agent, or Firm*—Nilles & Nilles

[57] ABSTRACT

Combustion is improved in a cylinder of a direct-injection stratified charge-type engine such as a diesel engine by injecting the fuel into the cylinder in the form of a rapidly expanding cloud. The expanding cloud is produced by a very short duration injection of rapidly falling velocity as close as possible to top dead center. The expanding cloud rapidly disperses the fuel droplets in a substantially uniform air/fuel ratio for efficient fast diffusion burning. The very short duration of injection close to top dead center substantially eliminates undesirable premixed burning, while the expanding cloud separates the droplets so they cannot agglomerate into large particles and cause wall wetting and consequent undesirable liquid fuel burning late in the cycle. The invention includes a system for damping the injector needle at the ends of both of its opening and closing strokes, enabling a lightweight, very fast-moving needle to be employed so that the full benefits of the short duration, rapidly falling injection velocity are achieved over most of the injection event.

17 Claims, 17 Drawing Sheets

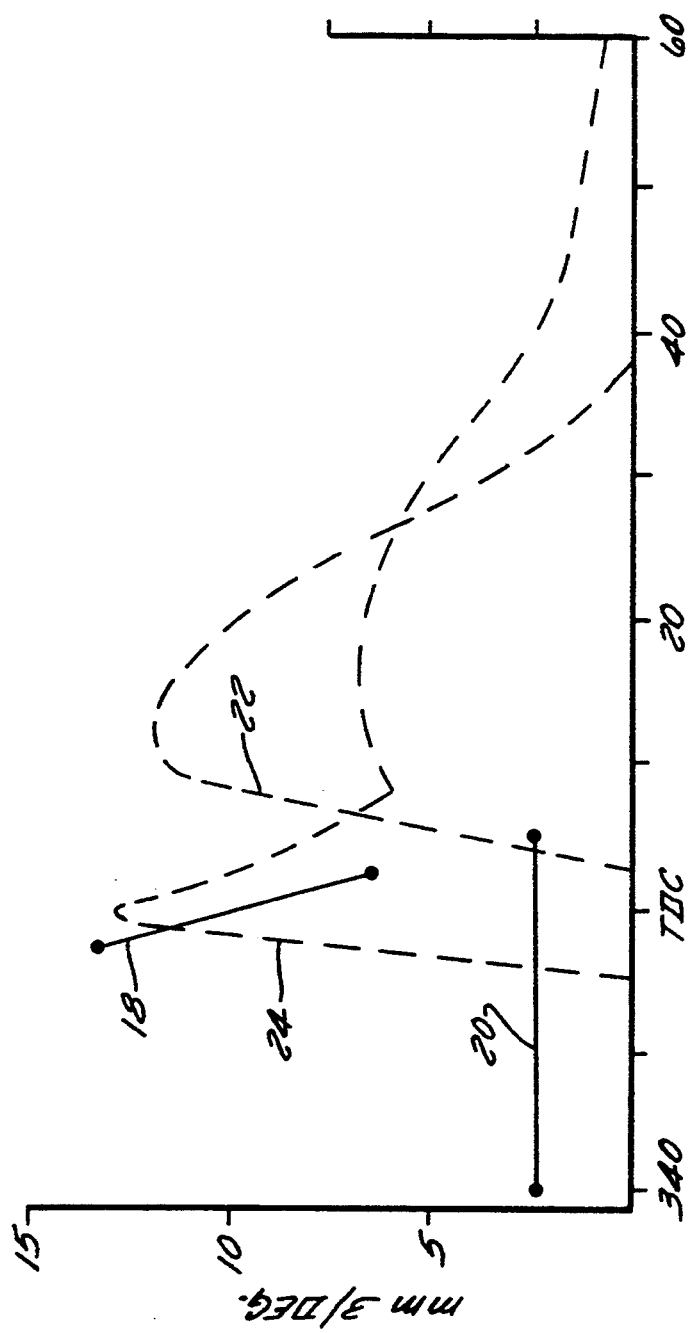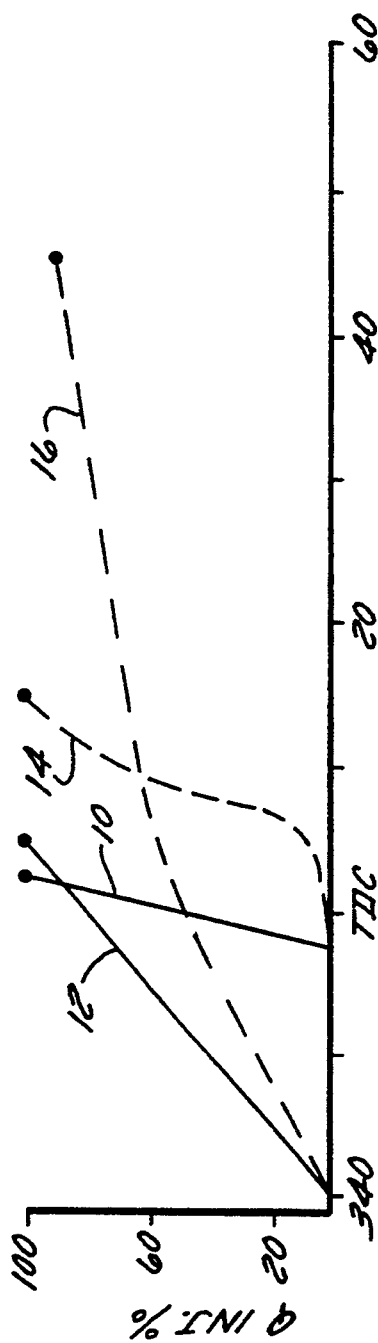

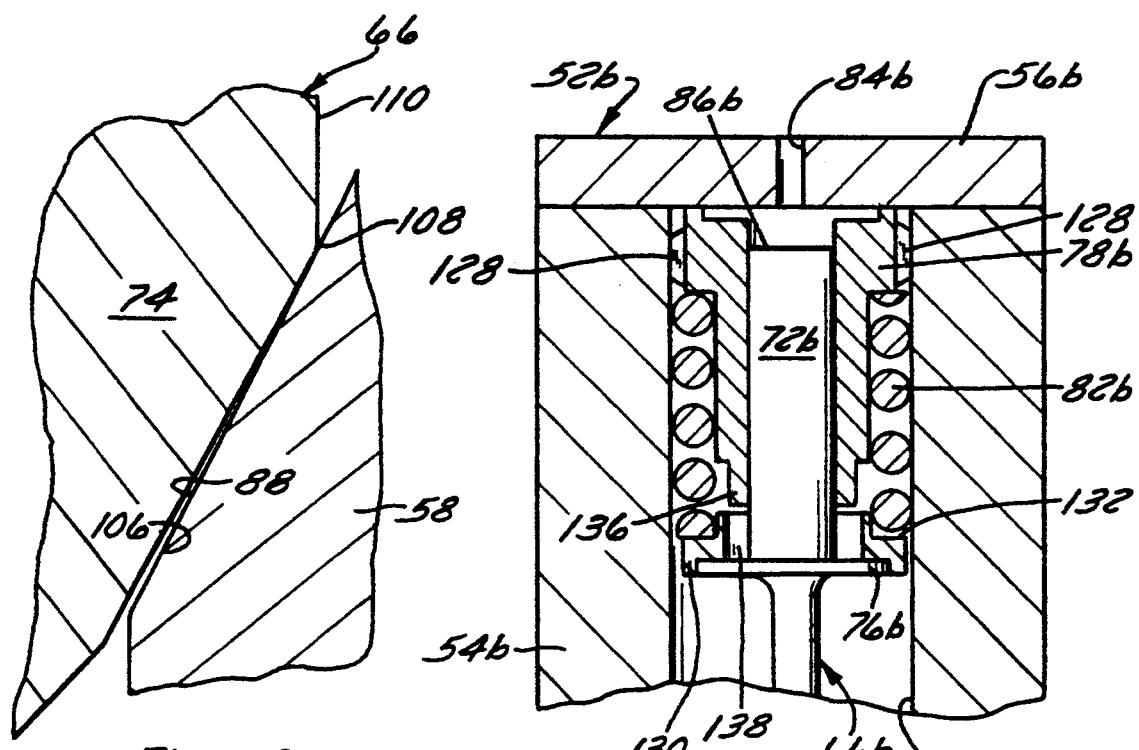
FIG. 16
FIG. 18
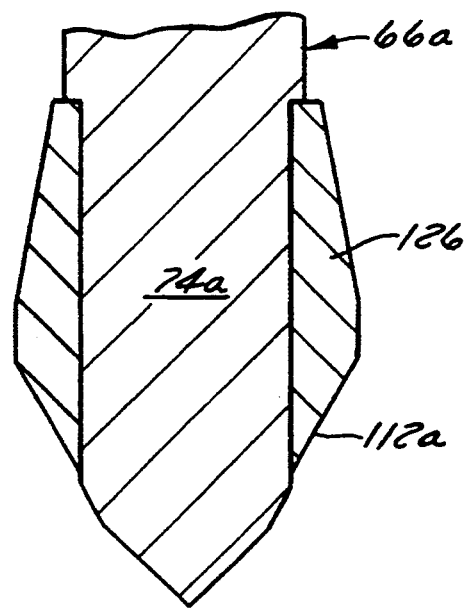
FIG. 17

EXPANDING CLOUD FUEL INJECTING SYSTEM

BACKGROUND OF THE INVENTION

1. Prior Related Applications

The present application is a continuation of Ser. No. 08/005,404, filed Jan. 19, 1993, now abandoned, for "Expanding Cloud Fuel Injection System" which is a continuation of application Ser. No. 07/613,933, filed Nov. 13, 1990, abandoned, which is a continuation of application Ser. No. 07/410,031, filed Sep. 20, 1989, abandoned, which is a continuation of application Ser. No. 07/198,668, filed May 25, 1988, abandoned, which is a continuation of application Ser. No. 07/016,773, filed Feb. 20, 1987, abandoned.

2. Field of the Invention

The present invention relates to fuel injection for internal combustion engines, and it relates particularly to direct, stratified-charge-type fuel injection such as employed in diesel engines.

3. Description of the Prior Art

Conventional fuel injection systems of the direct, stratified-charge type employed for diesel engines employ a long-duration injection wherein the jet exit velocity is, on the average, constant or rising during the injection event. Typically the long-duration conventional injection must start very early in the cycle to get the required quantity of fuel into the combustion chamber early enough to minimize adverse effects of injecting into an expanding, cooling cylinder chamber which results in inefficiency, smoke and hydrocarbon emissions. Typically the conventional long-duration injection will commence at a cam angle 20°-30° before top dead center, and will continue on past top dead center. Because of this early start of injection, a considerable amount of fuel, normally about 25-50 percent of the total quantity injected, will be atomized and vaporized prior to the start of combustion.

The problems caused by the conventional combination of long-duration injection and constant or rising jet exit velocity during the injection event are serious. The long duration of injection prior to the start of combustion and the resulting large amount of fuel already vaporized and mixed with air at the time of ignition results in a large amount of premixed burning accompanied by a rapid rate of heat release at the beginning of ignition which causes excessively high temperatures that loads the vehicle cooling system, excessively high peak cylinder pressures and rate of pressure rise which can damage crank shafts, bearings, cylinders, castings and other parts, excessively high noise level, and excessively high oxides of nitrogen emissions. This initial high rate of heat release is often accompanied by detonation.

The generally constant or rising injection exit velocity of conventional injection systems produces a compressing injection plume or cloud wherein later-injected droplets catch up with earlier-injected droplets, causing droplet collisions and agglomerations and a resulting rapidly rising average droplet size after ejection of the droplets from the nozzle. Data indicates that, on the average, droplet volume is likely to increase approximately eightfold in Sauter Mean Diameter within approximately one millisecond from the start of injection. The agglomerated droplets have greatly increased momentum relative to drag, which carries them to the wall, producing a considerable amount of wall wetting. The large agglomerated droplets and fuel on the wall take a much longer time to burn than small, well-dispersed droplets in the combustion chamber, and the resultant late burning phase which is occurring on the downstroke of the piston reduces engine efficiency and causes the production of undesirable exhaust emissions including smoke, particulates, and unburned hydrocarbons.

For conventional injection systems, premixed burning will generally account for up to about 40 percent of the total fuel burned, while the late burning of fuel that was on the wall or in large agglomerated droplets will generally account for up to about 30 percent of the total fraction of injected fuel. The net result is very poor engine efficiency as reflected in brake specific fuel consumption. Efficiency drops rapidly for diesel engines smaller than approximately 2.5 liters per cylinder which accounts for approximately 95 percent of the diesel engines in the world today, and it is most severe for small diesel engines of approximately 0.5-1.0 liter per cylinder, which includes all diesel passenger cars.

Such early premixed burning and late liquid fuel burning and their serious adverse consequences are substantially completely avoided by the present invention. This is accomplished by an extremely rapid injection event close to top dead center which is too rapid for substantial premixing, and developing a very rapidly expanding and dispersing fuel cloud from the short-duration injection event by means of a rapidly and substantially uniformly decreasing injection velocity during the course of the injection event, the expanding cloud rapidly dispersing the fuel and preventing droplet agglomerations and consequent wall wetting and liquid fuel burning. The very short injection duration and rapidly falling injection velocity are accomplished with the use of accumulator-type injection, accompanied by use of a high velocity, low mass injector needle, damping at the ends of both the opening and closing strokes of the needle, and greatly enlarging injector orifices and passages.

Prior art accumulators, although inherently having the characteristic of a falling velocity during injection, had such a relatively long injection period and relatively slowly falling velocity as to produce injection plumes which resembled the conventional constant velocity, long-duration injection plumes, resulting in droplet agglomeration, heavy concentration of fuel at the tip, and considerable wall wetting. With the relatively long duration of injection employed with prior art accumulator injectors, the falling velocity actually worsened the early premixed burning and late liquid fuel burning problems because a larger percentage of the fuel was injected at the head of the plume at too early a crank angle in the cycle. Because of this, the art has gone away from accumulator-type injectors and has universally gone to long-duration constant or increasing velocity injectors.

Accumulator-type injectors representative of the state of the art relative to accumulator injectors are disclosed in Falberg U.S. Pat. No. 2,985,378, Berchtold U.S. Pat. No. 4,566,416, Loyd U.S. Pat. No. 4,414,940, Beck et al. U.S. Pat. No. 4,628,881, and a 1957 publication by Hooker in the Volume 65, 1957 issue of "SAE Transactions," pages 293-330, and particularly at pages 316-317.

SUMMARY OF THE INVENTION

In view of these and other problems in the art, it is a general object of the present invention to provide a novel fuel injection system of the direct, stratified-charge-type as universally employed for diesel engines, which improves fuel consumption efficiency for engines of all sizes, and dramatically for medium and small size engines having per cylinder displacements less than about two liters.

Another object of the invention is to provide a fuel injection system of the character described which substantially eliminates all of the adverse side effects produced by conventional direct injection systems, including undesirably high temperatures, excessive peak cylinder pressures which can cause physical damage to the engine, excessively high noise levels, excessive emissions of nitrogen oxides, undesirable smoke and unburned hydrocarbon emissions, and loss in efficiency.

Another object of the invention is to provide a fuel injection system of the character described which times the injection event and dispersion of the fuel relative to crank angle such that substantially all of the combustion is of the fast air diffusion-type burning which is the most efficient type of burning for optimum power output with minimum mechanical stresses and undesirable exhaust emissions.

Another object of the invention is to provide a fuel injection system which is, in effect, a two-stage injection accomplished by only a single injector and without need for a spark assist, with a small pilot premixed portion of the fuel providing preignition for the main body of fuel that is injected.

A further object of the invention is to provide an injection system of the character described which substantially completely eliminates adverse premixed burning which can cause detonation, excessively high temperatures, excessively high peak cylinder pressures, high noise levels, and excessive emissions of nitrogen oxides.

A further object of the invention is to provide an injection system of the character described which substantially eliminates late burning of liquid fuel on the combustion chamber wall and in large, agglomerated droplets, thereby substantially eliminating smoke, unburned hydrocarbon emissions, and loss in engine efficiency.

A further object of the invention is to provide a fuel injection system wherein the time duration of the injection event is so rapid and so closely proximate top dead center of the cycle that minimum premixed combustion can occur.

A further object of the invention is to provide a fuel injection system of the character described which produces a rapidly expanding and dispersing fuel cloud from the injection event wherein there is essentially no interaction between individual droplets and therefore no increase, but only rapid decrease, in droplet size after the droplets leave the injector nozzle, thereby providing efficient fast diffusion-type burning, and substantially avoiding wall wetting and late liquid fuel burning.

A still further object of the invention is to provide a fuel injection system of the character described which enables a substantially uniform air/fuel mixture to be dispersed in the combustion chamber, filling only a fraction or substantially all of the combustion chamber in a stratified charge according to the power and speed demanded of the engine.

A further object of the invention is to provide a fuel injection system of the character described wherein the combination of a very short duration of the injection and a rapidly falling velocity during the injection provides a novel expanding cloud of rapidly dispersing fuel for efficient diffusion burning without substantial premixed burning or wall wetting-type burning.

Another object of the invention is to provide a fuel injection system of the character described wherein droplet size is controllable and determinable for achieving both an optimum combustion rate and an optimum droplet penetration length for any per cylinder size engine.

Yet a further object of the invention is to provide a novel injector needle damping system for damping the needle at the end of both of the opening and closing strokes, which, coupled with a low mass, high speed needle, enables most of the injection event to have the rapidly falling injection velocity of the invention.

The present invention consists of a method and apparatus for greatly improving combustion in a direct injection, stratified charge-type engine such as a diesel engine, by radically changing the fuel injection timing and rate of flow during the injection. By timing the duration of injection to be much shorter than prior art injections, by timing the injection event to be as close as possible to top dead center, and by injecting with a rapidly and continuously falling velocity, adverse premixed burning and late liquid fuel burning are both substantially eliminated, with substantially all of the burning being of the desirable, efficient diffusion type. The very rapid injection event gives no time for vaporization and premix, except for a very small pilot charge from the fog ripped off by the nozzle during injection, and that amount can be controlled by the configuration of the injection orifice. Timing the rapid injection proximate top dead center provides the hottest condition for compression ignition of the pilot charge, yet essentially all ignition will occur after top dead center for full use of torque developed.

The rapidly falling velocity expands and disintegrates the injected liquid core and rapidly disperses the fuel in the combustion chamber very soon after the end of injection, so that the rapid diffusion burning can proceed soon after the end of injection. The expanding cloud disperses the fuel droplets such that there is essentially no interaction between individual droplets and therefore no increase, but only rapid decrease, in droplet size after the droplets leave the injector orifice. Because of the rapid dispersal and continuous and rapid decrease in droplet size, vaporization and mixing with air is also rapid, and the expanding cloud stops short of the combustion chamber wall, so essentially no liquid fuel burning with its adverse effects can occur. The expanding cloud avoids any concentration of fuel toward the head of the plume, with the result that a substantially uniform air/fuel ratio can be achieved in the combustion chamber for maximum efficiency of burning.

The invention includes a novel damping system for damping the injector needle both at the end of the opening stroke and at the end of the closing stroke, enabling a lightweight, very fast-moving needle to be employed so that the full benefits of the short duration, rapidly falling velocity are achieved over most of the injection event.

An accumulator-type injector is employed to produce the short duration, rapidly falling velocity required for the invention, with the low mass, damped needle, and with the injection orifices opened up much larger than conventional orifices, and also the area of the sac and the area of the seat opened up much larger than those of conventional injectors to enable a full charge of fuel to be injected during the very short duration injection.

A series of approximate physical limits has been determined which, if followed, will assure that an injection system has the desirable characteristics of the invention.

BRIEF DESCRIPTION OF THE DRAWINGS

These and other objects and advantages of the invention will become more apparent from the following Detailed Description and the accompanying drawings, wherein:

FIG. 2 is a graph illustrating the cumulative fuel quantity injected, and the fraction thereof which is vaporized and mixed with air, both for an injection according to the invention and a conventional injection;

FIG. 3 is a graph comparing the rate of heat release between an injection according to the invention and a conventional injection;

FIG. 16 is an even further enlarged view of the region encircled in FIG. 14;

FIG. 17 is an axial sectional view of an alternative needle tip;

FIG. 18 is a fragmentary axial section, partly in elevation, illustrating an alternative needle opening damper;

DETAILED DESCRIPTION

Figure 1A:
FIGS. 1A, 1B and 1C are high-speed photographs of an injection spray illustrating sequential events during and after the time duration of the injection, and illustrating the expanding cloud of the invention.

The present invention is a fuel injection method and apparatus for producing a stratified charge-type fuel injection spray for internal combustion engines which has particular utility for compression ignition engines, but which is also applicable to internal combustion engines of all types.

The method and apparatus of the invention produce a jet spray that becomes an expanding cloud during and immediately following the injection event. This expanding cloud is produced by a rapidly decreasing jet spray exit velocity during substantially the entire injection event, combined with a very short injection event duration. The rate of decrease of the jet spray exit velocity is controlled to be greater than the rate of decrease of the spray tip velocity. The rapidly decreasing spray exit velocity combined with the short injection duration causes the spray to first expand along the axis of the liquid spray core, followed by rapid dispersal of the spray droplets in the transverse direction. The injection event is timed as closely as possible to a crank angle proximate top dead center.

A synergistic series of new and fundamental physical characteristics is established within the combustion chamber. First, a substantially uniform air/fuel ratio is achieved in the expanded cloud for uniform, optimum combustion, instead of the spray becoming increasingly concentrated or rich as it approaches combustion chamber walls as with conventional fuel injector sprays. Second, the combustion is substantially entirely of the fast air diffusion-type burning which is the most efficient type of burning for optimum power output with minimum mechanical stresses on the engine and minimum undesirable exhaust emissions. Third, the premixed burning phase typical of conventional engines is substantially eliminated. The premixed burning phase is undesirably rapid, causing detonation, excessively high temperatures, excessively high peak cylinder pressures which can cause physical damage to the engine, excessively high noise levels, and excessive emissions of nitrogen oxides. Fourth, the wall wetting burning phase typical of conventional engines is substantially eliminated. Wall wetting causes undesirable smoke and unburned hydrocarbon emissions, and loss in efficiency.

Applicants' have named the novel expanding cloud aspect of the invention "Expanding Cloud Injection Spray," often abbreviated as "ECIS," and have named the fast air diffusion burning aspect of the invention "Fast Air Diffusion Combustion System," often abbreviated as "FADS." Thus, the method and apparatus of the present invention are often referred to by applicant as the "ECIS-FADS" System.

Diesel engine combustion is conventionally classified into two parts, (1) premixed burning, and (2) diffusion burning. Premixed burning is characterized by a very rapid and often detonating-type combustion caused by spontaneous ignition of a relatively large mass of fuel which was injected and premixed with the air mass at a crank angle interval on the order of 20°–30° before top center. This fuel typically does not ignite immediately because of the relatively low pressure and temperature in the cylinder when it is injected, but is delayed by a time interval called "ignition lag" after which time the entire premixed mass of fuel and air ignites spontaneously and suddenly, often with detonation and very high levels of pressure, rate of pressure rise, NOx formation and noise, all of which side effects are normally quite undesirable.

The diffusion burning phase of combustion involves the orderly diffusion of gaseous fuel and oxygen accompanied by smooth and complete combustion of the fuel. This phase of combustion is similar in many respects to the burning in a flame of a bunsen burner or a candle. However, in an engine it is desirable to have the combustion proceed as rapidly as possible so as to enhance the thermal efficiency by releasing the heat energy at the earliest practical time in the expansion cycle (i.e., close to but after top center), thereby increasing the work output of the engine. Vaporized fuel-to-air diffusion burning is the most desirable type to attain complete and efficient combustion with a minimum of unwanted side effects.

Applicant hereby defines what is clearly a third phase of combustion, which applicants call liquid fuel and wall wetting combustion. This third type of combustion involves the vaporization, mixing, and combustion of fuel which was sprayed initially in a liquid form onto the combustion chamber wall, and also large unvaporized fuel droplets. As will be discussed hereinafter in detail, agglomeration of colliding smaller droplets generally causes relatively large liquid droplets to form in conventional fuel injection sprays. The combustion of fuel in the liquid and wall wetting phase ultimately becomes a diffusion flame, but first wall wetting fuel must be swept off the wall by air motion, and this fuel and the large liquid fuel droplets must boil and subsequently become mixed with air, followed by relatively slow diffusion burning in the gaseous phase.

The liquid fuel and wall wetting combustion phase often involves the spray of liquid fuel into hot products of combustion which have been depleted of oxygen and typically results in the generation of carbon particles and soot prior to becoming mixed with sufficient air to complete combustion. This soot-forming characteristic is typical of both fuel which has been sprayed on the walls and the large agglomerated fuel droplets. The liquid fuel and wall wetting phase of burning has the serious unwanted side effects of engine inefficiency from late burning, and the production of undesirable exhaust emissions including smoke, particulates, and unburned hydrocarbons.

The ECIS-FADS system of the invention substantially completely eliminates the premixed burning first phase of combustion and liquid fuel and wall wetting third phase of combustion, and all of the aforesaid undesirable side effects of the first and third phases of combustion.

With the ECIS-FADS spray, the premixed burning first phase of combustion is substantially completely avoided by the liquid fuel core remaining substantially intact until ignition has occurred, followed by very rapid dispersion of the fuel spray and the burning proceeding through the dispersed spray at a slower rate than the dispersion. An important aspect of the ECIS-FADS system is that the timing of the beginning of injection is precisely controlled such that the end of injection does not occur too long before the start of ignition, so that only minimal dispersion will have occurred when ignition starts, thus avoiding the usual premixed Phase I burning. The ideal case is for the duration of injection to be equal to or slightly less than the ignition lag period.

Nevertheless, it is desirable to develop a very small pilot charge which is produced and becomes premixed during the injection event. This is produced by friction between the wall of the hole and the liquid stream as it is injected through the hole, and this pilot charge is controlled as to its percentage of the total quantity of fuel injected during the event by the configuration of the hole. Some of the peripheral fuel will be torn off into a fog by friction during the injection event, for example, not more than approximately 10 percent, and the limited amount of air in this fog and the time required for vaporization of the fog droplets and mixing with air will produce a very small vaporized mixture of fuel and air capable of starting ignition according to the crank angle timing relative to the injection event, preferably closely proximate the end of the event. Velocity vectors transverse to the direction of injection are developed by the hole friction depending upon the L/D (length/diameter) ratio of the hole, and with the very rapid ECIS-FADS spray, an L/D ratio can be selected to produce an amount of vaporized fuel on the order of less than approximately 5 percent for this premixed pilot charge.

This pilot charge and its ignition is then the first stage of a two-stage injection effect producible by a single injector. At the end of this first stage, the reducing velocity between the head and the tail of the spray caused by the rapidly falling jet velocity during the injection event will cause rapid dispersion and vaporization of the of the remainder of the fuel as the second stage injection effect. All of the injected fuel in effect stops in its tracks after a time equal to approximately twice the time duration of injection, and then dispersion and distribution and vaporization of the fuel spray caused by the falling velocity will proceed extremely rapidly and will be complete in a period approximately equal to four times the injection duration.

It is generally considered in the art that the rapid and often violent combustion of the premixed charge associated with conventional long-duration injector jets is caused by the fuel which is injected into the cylinder prior to the point of ignition of the charge. This is certainly true with respect to conventional long-duration jet sprays which have a duration on the order of 2–10 times longer than the ECIS-FADS jet duration, and where generally about 25–50 percent of the fuel has become atomized and vaporized prior to the start of combustion. This general thinking in the art is completely contrary to what occurs with ECIS-FADS, and is believed to be a primary reason that the current state of the art is to employ long-duration jets. However, this conventional thinking does not apply to ECIS-FADS, because with ECIS-FADS there is at most only a tiny pilot amount of fuel vaporized and mixed with air by the time the entire charge of fuel has been injected. Rapid, uncontrolled burning of any substantial part of the fuel charge cannot occur with ECIS-FADS because prior to ignition almost all of the liquid fuel is undispersed and unvaporized, and it is impossible to burn fuel in the liquid state, i.e., before it becomes vaporized.

With conventional long-duration injector sprays, the injection commences long before top dead center, as for example typically 20°–25° crank angle before top dead center, and therefore there is an extended time for breakup of a large portion of the spray into atomized and vaporized form prior to ignition. This is a sort of continuous breaking up action, and occurs on the wrong side of top dead center and ignition, namely prior to these events. With ECIS-FADS, injection occurs proximate top dead center, and there is a specific, almost instantaneous breakup phase which occurs after top dead center as a result of the rapidly falling injection velocity; and with ECIS-FADS ignition therefore will not start until proximate or after top dead center.

Wall wetting is caused by the long duration of conventional fuel injection sprays, and by the relatively large amount of momentum carried by large, agglomerated droplets. Droplet mass is proportional to the cube of the droplet diameter, whereas the droplet cross-sectional area is proportional to the square of the droplet diameter, so that droplet momentum relative to drag is approximately proportional to particle diameter. Conventional injector jet sprays with a constant or rising injection velocity have a rapidly rising average droplet size after ejection of the droplets from the nozzle caused by droplet collisions and agglomerations as the tail of the plume catches up with the slowing down head of the plume in a rapidly compressing cloud. With conventional fuel injection systems, for diesel engines smaller than 2.5 liters per cylinder, it is inevitable that there will be wall wetting, and a below 2.5 liters per cylinder, the percentage of fuel on the wall increases substantially in proportion to the decrease in displacement. This includes approximately 95 percent of the diesel engines in the world today. For small engines of approximately 0.5–1.0 liter per cylinder, the problem is quite severe. This includes all diesel passenger cars. The wall wetting problem is also quite substantial for medium-size diesel engines of from 1–2 liters per cylinder displacement, which includes the heavy-duty trucks and farm tractors.

Wall wetting and its associated problems are avoided with use of the ECIS-FADS fuel injection system. The rapidly falling velocity pulls the jet plume apart rapidly, and coupled with the very short duration, the injection event can be timed to substantially completely eliminate wall wetting. As a rule of thumb, penetration of the jet plume will stop at approximately twice the time duration of the injection with the rapidly falling velocity of the ECIS-FADS system, so the penetration can be precisely limited short of the combustion chamber wall. By limiting the time duration of the injection in milliseconds to less than the time for an unimpeded jet to travel a distance of twice times the diameter of the cylinder bore, or by limiting the time duration of the injection to less than 15° crank angle, wall wetting can be substantially completely eliminated with the ECIS-FADS system. These and other physical limits defining the ECIS-FADS system are set forth in detail hereinafter.

Another factor in the avoidance of wall wetting with the ECIS-FADS system is the substantially complete lack of droplet interaction and agglomeration within the injected plume, so that droplet momentum relative to drag does not increase as with conventional jet sprays; to the contrary, the separated, independent droplets of the expanding cloud ECIS-FADS spray plume rapidly decrease in size, and hence momentum, relative to drag after they are injected so that when they are dispersed by the rapidly decreasing velocity of the ECIS-FADS spray, the outermost droplets will stop short of the combustion chamber wall. It is estimated that without the rapidly falling velocity of the ECIS injection event, the forward tip of the plume would travel at least about twice as far as the ECIS-FADS plume.

There is a synergistic cooperation between the avoidance of wall wetting and the expanding cloud produced by the rapidly falling ECIS injection velocity. With the expanding cloud stopping short of the wall for the foregoing reasons, all of the potential benefits of the expanding cloud are enabled to be fully realized, whereas these benefits would otherwise have been seriously diminished by conventional wall wetting. Summarizing some of the benefits of the ECIS-FADS injection which are thus enabled to be fully realized without wall wetting, they include substantially uniform air/fuel distribution in the combustion chamber, rapid dispersion and vaporization, efficient burning characteristics, controlled and desirable pressure/time history, and rate of pressure rise, substantially increased engine efficiency, lower unburned hydrocarbon emissions, and elimination of smoke.

An unexpected benefit achieved by the expanding cloud stopping before the tip of the plume strikes and wets the combustion chamber wall is that the tip of the plume can be adjusted to provide an air insulating layer between the combustion flame and the outer wall of the piston cavity defining the combustion chamber. This can result in a dramatic reduction of piston temperature and heat losses from the combustion chamber, with corresponding increased engine efficiency.

Even if there were to be some wall wetting from an ECIS-FADS spray, it would be much less than from a conventional spray because of the substantially uniform air/fuel distribution in the expanding cloud and lack of droplet agglomeration and prevention of increased fuel density proximate the wall.

The Expanding Cloud

Figure 1B:
Figure 1C:
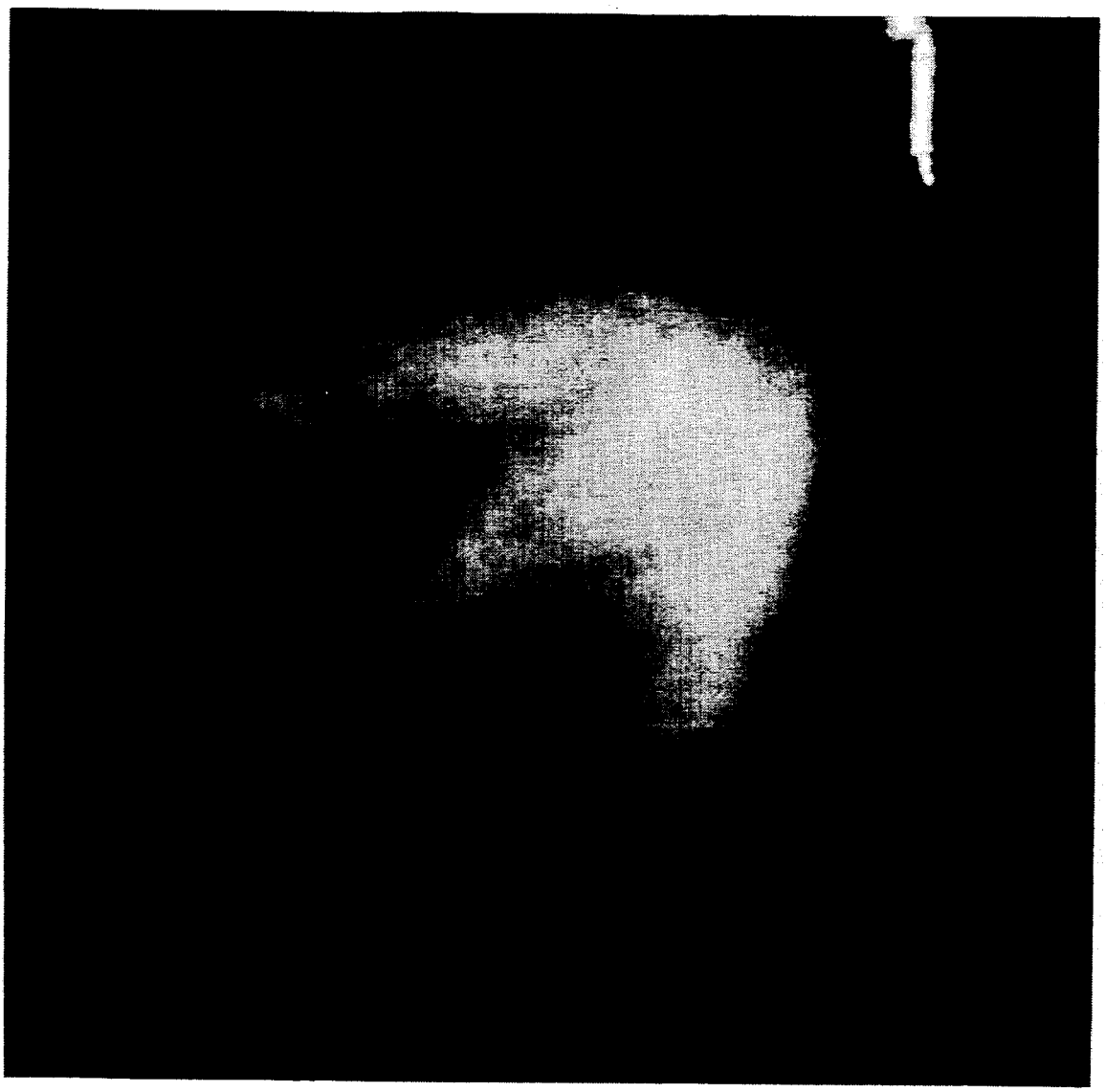

Referring to the drawings, FIGS. 1A, 1B and 1C are high speed photographs of a typical ECIS-FADS injection spray illustrating sequential events during and after the time duration of the injection. This injection was performed through nine jet orifices. The time duration of the injection event was 300 microseconds (0.3 milliseconds). The velocity at the beginning of injection was 360 meters per second, and at the end of injection was 120 meters per second, with the rate of falling velocity substantially constant during the injection. Thus, the rate of velocity change during the injection event (expressed sometimes hereinafter as -dUj/dt) was −240 meters per second in 0.3 milliseconds, or 0.800 meters per second per millisecond, or −800,000 meters per second per second.

FIG. 1A shows the injection at 100 microseconds (0.1 milliseconds) from the start, at which point approximately 36 percent of the fuel has been injected. FIG. 1B shows the injection event at 300 microseconds (0.3 milliseconds), which is right at the end of the injection event with 100 percent of the fuel injected. At this point, the liquid core is still a continuous stream (determined by its electrical conductivity), and the visible cloud envelope contains a pilot charge of less than about 5 percent vaporized liquid mixed with air. After 400 microseconds (0.4 milliseconds), rapid dispersal of the spray has started. FIG. 1C shows the expanded cloud at 600 microseconds (0.6 milliseconds) after the start of injection, at which time dispersal of the spray is complete and much of the forward part of the plume has already vaporized.

Summarizing the way the short-duration, rapidly decreasing velocity ECIS-FADS injection spray disperses after the end of the injection event as illustrated in the high speed photographs of FIGS. 1B and 1C, immediately after the injection has stopped, the liquid core has stretched from the rapidly decreasing velocity to the point that it cannot stay intact any longer. Immediately after the injection event, the core starts to break up, and this process snowballs, breaking up the entire jet, and the jet is atomized and partially vaporized in a period of time no longer than the injection period itself. Thus, in one injection period, there is a primarily liquid core, plus some fog ripped off the core by friction with the holes and the compressed air in the cylinder, and there is a very small pilot vaporization and mixing with air in this fog which is ready for pilot ignition. Then, in approximately two injection periods, the core has been completely broken up and has expanded almost explosively as an expanding cloud into a fully atomized cloud ready to follow up the pilot ignition with fast diffusion burning of liquid droplets.

Comparison Between an ECIS-FADS Injection and a Conventional Injection

Because the fully injected multiple ECIS-FADS jet spray shown in FIG. 1B resembles the smoke trails of the U.S. Navy's Blue Angels precision flying team during a diverging maneuver, the ECIS-FADS multiple jet spray is sometimes referred to as "the Blue Angel."

A presently preferred ECIS-FADS injection system has the following injection, ignition, vaporization, and combustion characteristics:

Start of injection—3° BTC (before top center)
End of injection—3° ATC (after top center)
Ignition lag—6°
Start of ignition—3° ATC
Fraction of fuel vaporized and premixed at 3° ATC, start of combustion, less than 5 percent
Time required to complete mixing—6°–12° ATC
Combustion 90 percent complete—25° ATC
Phase I (premixed burning) combustion fraction of total fuel—less than 5 percent
Phase II (diffusion burning) combustion fraction of total fuel—greater than 95 percent
Phase III (liquid fuel and wall wetting) combustion fraction of total fuel—0 percent By way of comparison, a conventional long-duration fuel injection system typically has the following injection, ignition, vaporization, and combustion characteristics:

Start of injection—20° BTC
Ignition lag—15°
End of injection—5° ATC
Start of ignition—5° BTC
Fraction of fuel in combustion chamber prior to ignition—60 percent
Fraction of fuel mixed and vaporized prior to ignition—40 percent
Combustion 90 percent complete—40° ATC
Phase I combustion fraction of total fuel—40 percent
Phase II combustion fraction of total fuel—30 percent
Phase III combustion fraction of total fuel—30 percent Time History of Fuel Injected, Vaporized and Mixed FIG. 2 is a graph illustrating the cumulative fuel quantity injected, and the fraction thereof which is vaporized and mixed with air, relative to crank angle, for the two specific examples given above of a presently preferred ECIS-FADS fuel injection and a conventional fuel injection. The quantity injected and amount vaporized and mixed are indicated on the Y axis, while crank angle from 340°, which is 20° before top center, through top dead center up to 60° after top center are represented on the X axis. The solid line designated 10 represents the ECIS-FADS injection event, with injection starting at 3° before top center and ending at 3° after top center. The solid line designated 12 indicates the conventional injection event which commences at 20° before top center and ends at 5° after top center. The dotted line designated 14 illustrates the cumulative percentage of fuel vaporized and mixed from the ECIS-FADS injection 10 relative to crank angle. It will be seen from curve 14 that not more than approximately 5 percent of the injected fuel has become vaporized and mixed by the end of injection event 10 at 3° after top center, for pilot ignition proximate 3° after top center. Then vaporization and mixing proceed rapidly with the expanding cloud to complete mixing of the fuel at approximately 15° after top center.

Dotted line curve 16 illustrates vaporization and mixing of the conventional fuel injection event 12, and it is seen to be drastically different than the vaporization curve 14 for the ECIS-FADS injection event 10. Thus, vaporization of the conventional spray commences immediately after the start of the injection event, and at 5° before top center 40 percent of the fuel has already become mixed and vaporized. Ignition commences at this point, so that the premixed charge for Phase I burning is 40 percent. Close to 60 percent of the fuel has been vaporized and mixed with air by the end of the injection event 12 at 5° after top center, but the vaporization and mixing of fuel continues on out to approximately 45° because of the late vaporization of fuel which wetted the combustion chamber wall and was in the form of large agglomerated fuel droplets.

Rate of Heat Release

FIG. 3 is a graph comparing the rate of heat release between an ECIS-FADS injection event and a conventional injection event. The rate of injection in cubic millimeters per degree crank angle and heat release in calories per degree crank angle is plotted for both injection events on the Y axis, relative to crank angle on the X axis. The rate and timing of the injection events are also illustrated in FIG. 3. The solid line designated 18 indicates the ECIS-FADS injection event, and the rapid drop of line 18 from commencement of injection at 3° before top center to completion of injection at 3° after top center is intended to indicate the rapidly falling velocity of the ECIS-FADS injection. Solid line 20 indicates the conventional injection event, commencing at 20° before top center and ending at 5° after top center. The horizontal orientation of conventional injection 20 is intended to indicate a constant injection velocity. Dotted line 22 indicates the ECIS-FADS rate of heat release, while dotted line 24 indicates the rate of heat release for the conventional injection.

Referring at first to the conventional heat release curve 24, the leading part of this curve starting with ignition at 5° before top center and the top portion of the spike proximate top center represent the Phase I premixed burning of fuel that has been vaporized and mixed with air in a chemically compatible mixture for burning prior to the start of ignition. This is an extremely rapid rate of heat release at the beginning of ignition, usually being so rapid as to have a detonation wave. Such rapid onset of ignition is unavoidable because the injection starts so early in the cycle and at a combustion chamber temperature that is still so low that the fuel cannot ignite immediately. Adverse results of this very rapid initial burning represented by the initial spike on heat release curve 24 include excessively high temperatures which loads the vehicle cooling system, excessively high peak cylinder pressures which can damage crank shafts, bearings, cylinders, castings and other parts, excessively high noise level, the noise being sound pressure waves created by vibrating parts, and excessive NOx emission. This initial high rate of heat release indicated by curve 24 is often accompanied by detonation, which is a thermal shock wave causing very rapid combustion.

Prior to the present invention, this premixed burning problem indicated by the initial rapid heat release part of curve 24 was curable by injecting a pilot charge of fuel into the cylinder even earlier than the main charge by means of a separate injector. Such a system is disclosed in the Loyd U.S. Pat. No. 4,414,940. However, such prior art pilot-charged systems were more complex and expensive than the conventional single injection system, not only requiring separate injectors, but also requiring spark plug ignition of the pilot charge. Such systems still had the long-duration and wall wetting problems, resulting in poor fuel economy, smoke, and undesirable unburned hydrocarbon emissions.

The portion of curve 24 from approximately 3° after top center to approximately 40° after top center represents Phase II diffusion flame burning, which is the ideal type of combustion in an engine. The portion of curve 24 which is later than about 40° after top center all represents Phase III liquid fuel and wall wetting type combustion. This Phase III combustion occurs in a rapidly expanding, and hence cooling, cylinder chamber, resulting in inefficiency, smoke, and undesirable hydrocarbon emissions.

The curve 22 in FIG. 3 representing the rate of heat release for an ECIS-FADS injection indicates less than about 5 percent Phase I premixed burning at the onset of the curve at 3° after top center, but this is such a very small amount of premixed burning that it causes none of the usual adverse results of premixed burning. All of the rest of the combustion represented by the ECIS-FADS curve 22 is of the ideal Phase II diffusion flame type burning of liquid fuel droplets.

Since the entire injection event occurs with the piston at or near top dead center, the effectiveness of air motion and turbulence for improving combustion rates is enhanced as compared to long-duration injection.

Pressure/Time History

Figure 4:
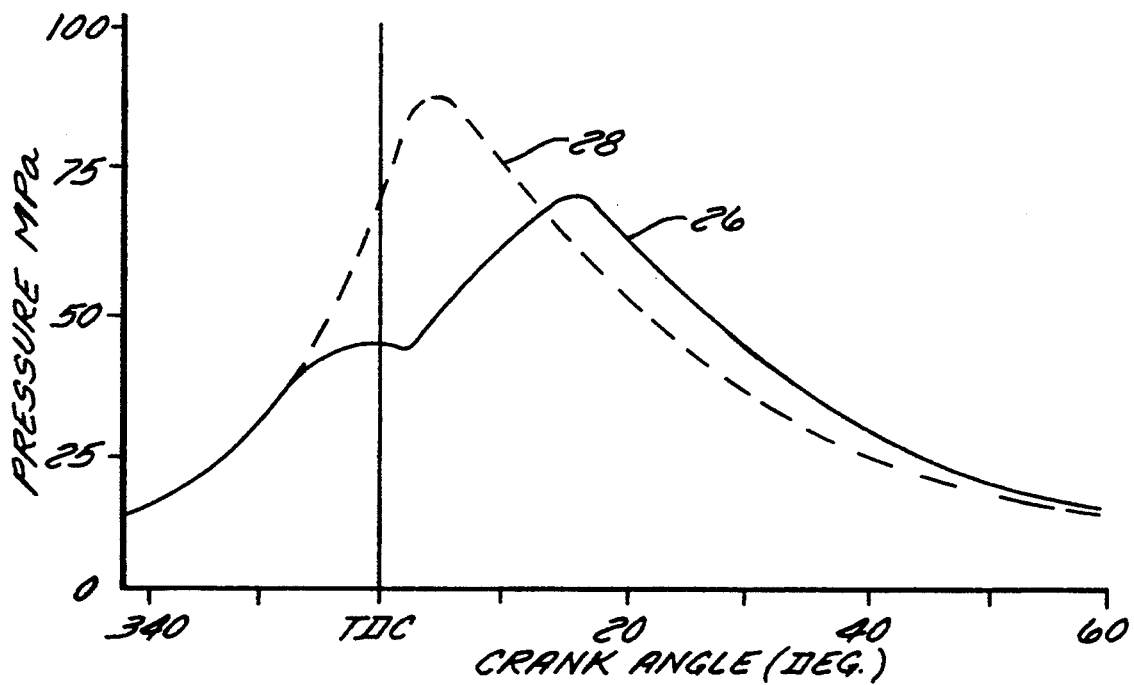
FIG. 4 is a graph comparing the pressure/time history between an injection and ignition according to the present invention and a conventional injection and ignition.

FIG. 4 is a graph comparing the pressure/time history between an ECIS-FADS injection and ignition and a conventional injection and ignition. Pressure is indicated on the Y axis in megapascals (1 megapascal equaling 10 atmospheres), while time designated by crank angle is represented on the X axis. FIG. 4, as for both FIGS. 2 and 3, is a comparison between the specific examples given above for the ECIS-FADS and conventional systems. Thus, the curves of FIGS. 2, 3 and 4 may all be physically related to each other.

The solid line curve 26 in FIG. 4 represents the pressure/time history for the ECIS-FADS combustion, while the dotted line 28 of FIG. 4 represents the conventional injection combustion. It will be seen that these curves generally overlap up to approximately 5° before top center, then are radically different from about 5° before top center to about 15° after top center, and then are very similar later than about 15° after top center. Curve 28 shows that for the conventional system, because of the large amount of premixed charge, before top center the pressure abruptly rises, and continues to sharply rise until it reaches a peak of approximately 9.0 megapascals at about 5° after top center, after which the pressure falls continuously. This sharp pressure rise and high pressure peak for the conventional system indicated by curve 28 creates excessive dynamic pressures, noise, and high oxides of nitrogen because the fuel is burning too fast and too hot. With the ECIS-FADS system illustrated by curve 26, the pressure rise is delayed until approximately 3° after top center, and although the pressure rise is rapid, it is neither violently so nor possibly detonating as indicated by curve 28 for the conventional system. The peak pressure is considerably lower for the ECIS-FADS system, being closer to 70 megapascals instead of about 9.0 megapascals, and the fuel is burning at a desirable rate which is not too fast or too hot. Thus, for the ECIS-FADS system as indicated by curve 26, noise is eliminated and the oxides of nitrogen emissions are much less. Additionally, with the pressure rise all coming after top center for the ECIS-FADS curve 26, all of the pressure rise performs useful work, providing increased power output and economy. To the contrary, quite a large portion of the pressure rise for the conventional curve 28 comes before top center, and this represents power loss. Torque output is proportional to area under curves 26 and 28, but is only useful for work after top center.

Rate of Pressure Rise

Figure 5:
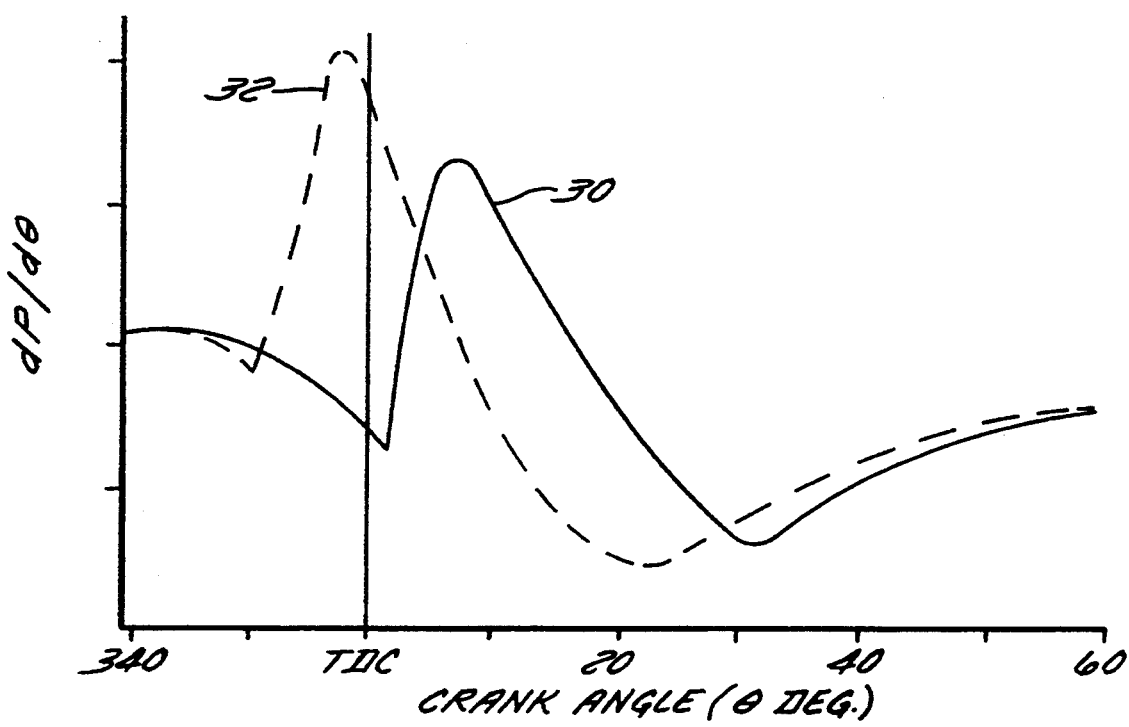
FIG. 5 is a graph comparing the rate of pressure rise between the present invention and the conventional injection system, relating to the same systems referred to in FIGS. 2, 3 and 4.

FIG. 5 is a graph comparing the rate of pressure rise between the ECIS-FADS system and the conventional system, relating to the same systems referred to in FIGS. 2, 3 and 4. The rate of pressure rise, dP/d0 is indicated on the Y axis and is compared with crank angle on the X axis. Solid line curve 30 represents the rate of pressure rise relative to crank angle for the ECIS-FADS system, while dotted line curve 32 represents the rate of pressure rise relative to crank angle for the conventional system. The rate of pressure rise for the conventional system is too early and too great because of the early and long injection, the fuel being prepared to burn too rapidly once combustion starts. This results in high engine stresses and wear, and external noise. With the ECIS-FADS system as indicated by curve 30, the combustion does not start until after top center, and therefore the rate of pressure rise is lower because the piston is starting to move downwardly. Also, the peak rate of pressure rise is considerably less for ECIS-FADS because there is not a large amount of premixed fuel that can burn almost explosively.

It will be seen from FIGS. 3, 4 and 5 that by injecting all of the fuel as closely as possible to top dead center and starting ignition after top center, the ECIS-FADS system provides an optimum combustion cycle. By reducing the front end of the injection to proximate top center, the ECIS-FADS system reduces the rate of pressure rise, noise, mechanical stress, and oxides of nitrogen. By reducing the tail end of the injection of proximate top center, the ECIS-FADS system reduces unburned hydrocarbons and smoke. In both cases, the ECIS-FADS system increases efficiency, since the combustion rate is controlled by the diameter of the burning droplets.

Time History of Fuel Droplet Size

Figure 6:
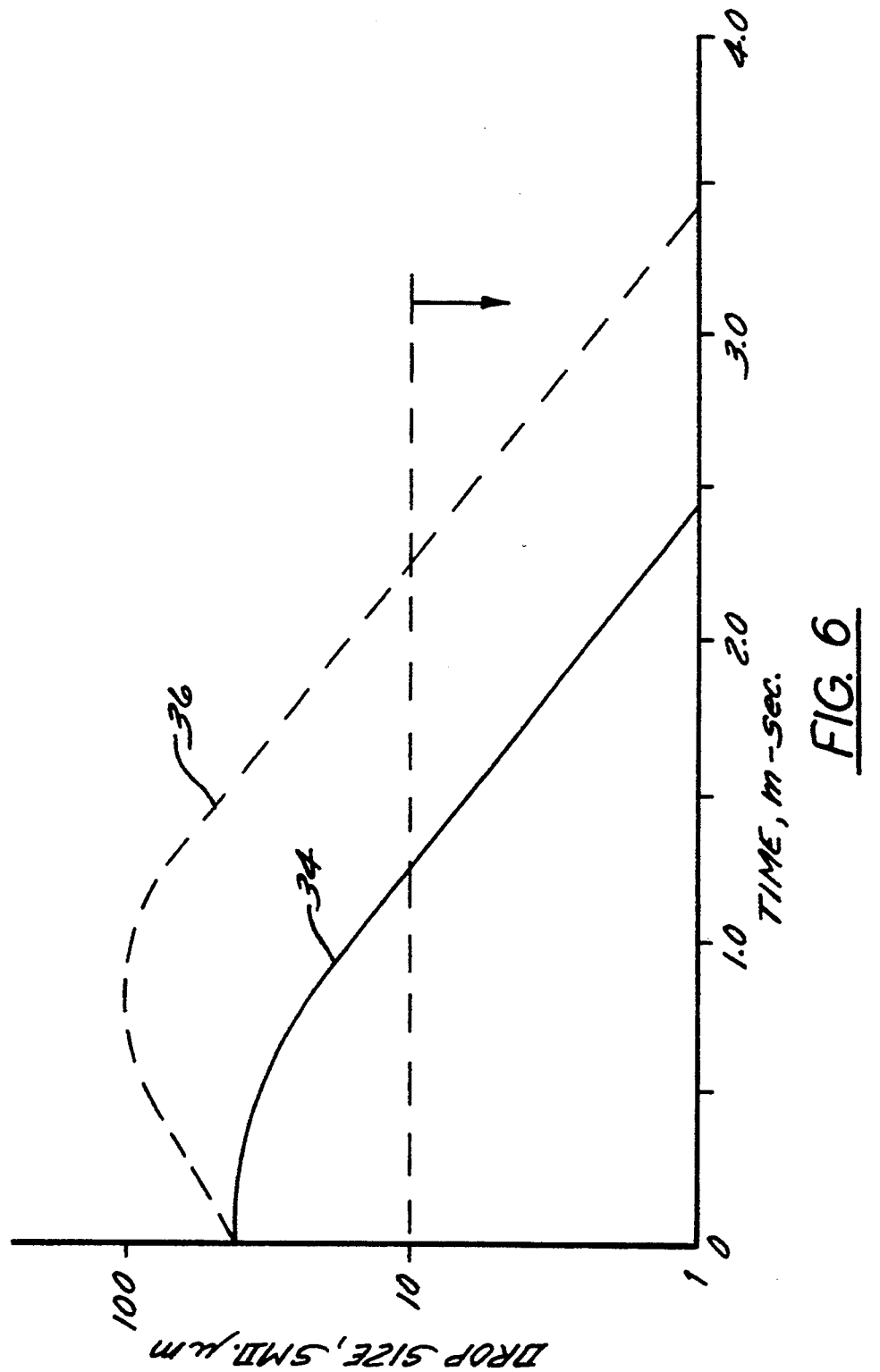
FIG. 6 is a graph comparing the time history of fuel spray droplet size from the time of droplet injection for the present invention and a conventional system.

FIG. 6 is a graph comparing the time history of fuel spray droplet size from the time of droplet injection for an ECIS-FADS system like that shown in FIGS. 1A, B and C having a uniformly decreasing velocity of −200,000 meters per second squared and a conventional injection system having a constant injection velocity. The Y axis is a log scale showing the Sauter Mean Diameter drop size in micrometers or microns, and the X axis is a linear scale of time in milliseconds. Solid line curve 34 for the ECIS-FADS injection shows a starting droplet size of approximately 50 microns, with the droplet size decaying right from the start at injection, at an increasingly rapid rate, reaching 10 microns at approximately 1.2 milliseconds, after which vaporization is very rapid. This continuous and increasing decay in droplet size is by vaporization, and is enabled by the rapidly decreasing injection velocity and resulting expanding cloud in which each droplet is independent of the other droplets, without droplet collisions and resulting agglomerations. Dotted line curve 36 is for the conventional system, and it shows an immediate and rapid rise in droplet size from approximately 50 microns up to approximately 100 microns or about double the initial droplet size a little prior to 1 millisecond from injection. Since droplet volume is proportional to the cube of diameter, the average droplet volume has increased approximately eightfold. After about 1 millisecond these much larger droplets then begin to decay in size, decaying down to 10 microns a little after 2.2 milliseconds, after which there will be very fast vaporization. FIG. 6 illustrates the tremendous power of the ECIS-FADS rapidly decreasing injection velocity for preventing particle agglomerations and consequent Phase III liquid fuel and wall wetting combustion.

Droplet size is a primary factor in determining the length of penetration of the spray plume, and can be positively predicted and controlled by the injection orifice diameter, which is a controlled quantity, and also somewhat by ambient pressure (determined by compression ratio), and to some extent by jet exit velocity, which relates directly to injection pressure and is positively controlled in the ECIS-FADS system. Injection pressure becomes a major factor in determining diesel fuel droplet size when the injection pressure falls below approximately 2,000 psi, which pressure will produce a jet exit velocity of approximately 2,000 psi and injection velocity of approximately 100 meters per second, the size of the droplets injected rapidly rises. Accordingly, the presently preferred minimum injection velocity for diesel fuel is approximately 100 meters per second. Curve 34 for ECIS-FADS in FIG. 6 shows how the rapidly falling velocity maintains control of droplet size after injection, whereas curve 36 for the conventional system shows how droplet size gets completely out of control after injection, growing at a rapid rate, and remaining much larger than the ECIS-FADS droplets over a relatively long interval of time as far as engine combustion is concerned.

The ability to thus control droplet size primarily by orifice size, and also by ambient pressure and injection pressure and velocity, and to maintain this control with the ECIS-FADS rapidly falling velocity, is very important for two specific reasons. First, droplet size controls the geographic location of the fuel in the combustion chamber after the rapidly expanding ECIS-FADS cloud has become fully expanded. Second, droplet size controls the rate of burning. Applicant has determined that the droplet size required to put the droplets in the right location for a particular size engine also gives the droplets the right burning rate for that size engine. Applicant has found that there is a very good correlation between droplet size and engine size to get the droplets in the right location and for the droplets to have the right burning rate. For example, droplets having a Sauter Mean Diameter of approximately 50 microns, with the rapidly falling ECIS-FADS exit velocity and short duration injection, provide excellent fuel distribution in the combustion chamber of a one liter per cylinder displacement engine, while at the same time providing a burning time of approximately 1,000 milliseconds, or one millisecond, which is just about right for a one liter per cylinder engine. Formulae relating both droplet penetration and burning time are set forth hereinafter.

Termination of the injection event when the falling velocity is still relatively high, preferably at least approximately 100 meters per second, causes the tail of the plume to be spaced substantially from the injector tip. It is therefore preferred to have the combustion chamber defined in the piston head as a generally annular cavity. This spacing of the tail of the plume radially outwardly from the injector tip is illustrated in the diagrammatic views of FIGS. 8-10.

Engine Efficiency

Figure 7:
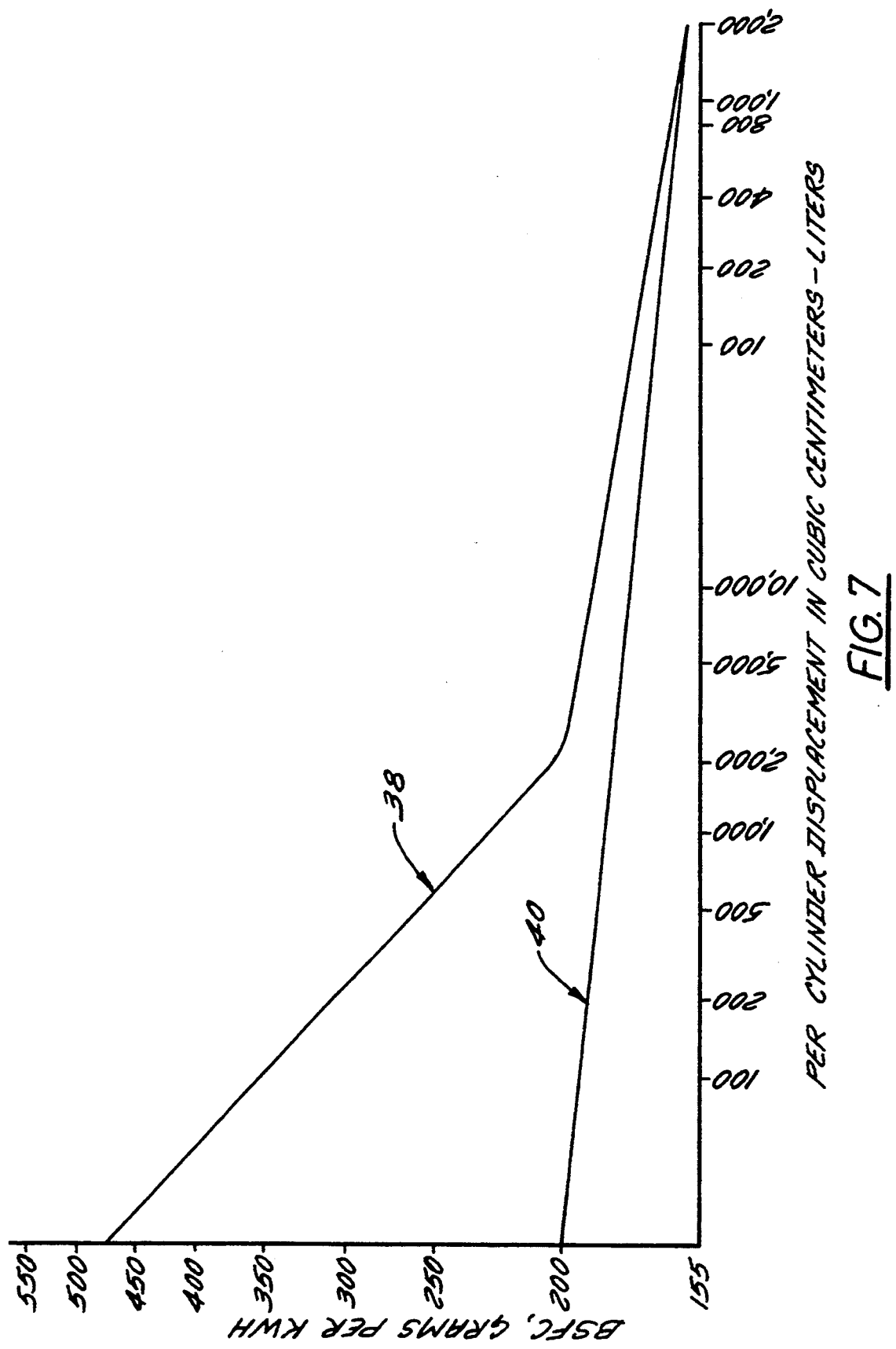
FIG. 7 is a graph comparing engine efficiency with per cylinder displacement for a conventional direct stratified charge injection system and the present invention.

FIG. 7 is a graph comparing engine efficiency with per cylinder displacement for a conventional direct stratified charge injection system and the ECIS-FADS direct stratified charge injection system. The Y axis is a log scale showing Brake Specific Fuel Consumption in grams per kilowatt hour. The X axis is also a log scale, showing displacement, to the left in cubic centimeters and to the right in liters. Curve 38 is for conventional fuel injection systems, and represents an averaging of data measured from many engines. It is seen from curve 38 that for large engines above about 2.5 liters, the engines are relatively efficient, with efficiency increasing (brake specific fuel consumption decreasing) as engine size increases. For displacements smaller than about 2 liters or 2,000 cubic centimeters, the brake specific fuel consumption goes up dramatically and steadily as the per cylinder displacement decreases. Efficiency is already dropping rapidly between 2,000 and 1,000 cubic centimeters per cylinder displacement, which includes most heavy-duty truck engines, and efficiency drops drastically for engines below 1,000 cubic centimeters, which includes all direct injected passenger car engines. The rapidly decreasing efficiency below 2,000 cubic centimeters per cylinder displacement is attributable to a large extent to Phase III liquid fuel and wall wetting combustion, wall wetting increasing generally directly proportionally with a decrease in per cylinder displacement. The increasing inefficiency is also attributable to the Phase I premixed burning problem.

Curve 40 in FIG. 7 is a projected efficiency curve for a typical ECIS-FADS type injection where there is no material amount of Phase III liquid fuel and wall wetting combustion, and essentially no Phase I premixed burning. It is seen that with the ECIS-FADS injection system, there is only a relatively small, gradual, generally uniform reduction in efficiency from the very largest per cylinder displacement to the very smallest per cylinder displacement, and there is no drastic decrease in efficiency below about 2.5 liters per cylinder, because of the substantial elimination of Phase III liquid fuel and wall wetting combustion and of Phase I premixed burning combustion, and because of an overall improvement in efficiency by virtue of the substantially uniform fuel air distribution in the combustion chamber achieved by the ECIS-FADS injection system. It is anticipated that the improvement in brake specific fuel consumption will range from approximately 5 percent for relatively large engines up to approximately 30 percent for relatively small engines.

Fuel Distribution

FIGS. 8-10 are diagrammatic top, axial views of combustion chambers divided according to the number of jet holes in the injector tips, and they illustrate the dramatic difference between fuel distribution from ECIS-FADS injections and fuel distribution from conventional injections. In each of the six views of FIGS. 8-10, the injector tip at the center is designated 42, the inner periphery of the combustion chamber is designated 44, and the outer wall of the combustion chamber is designated 46.

Figure 8A:
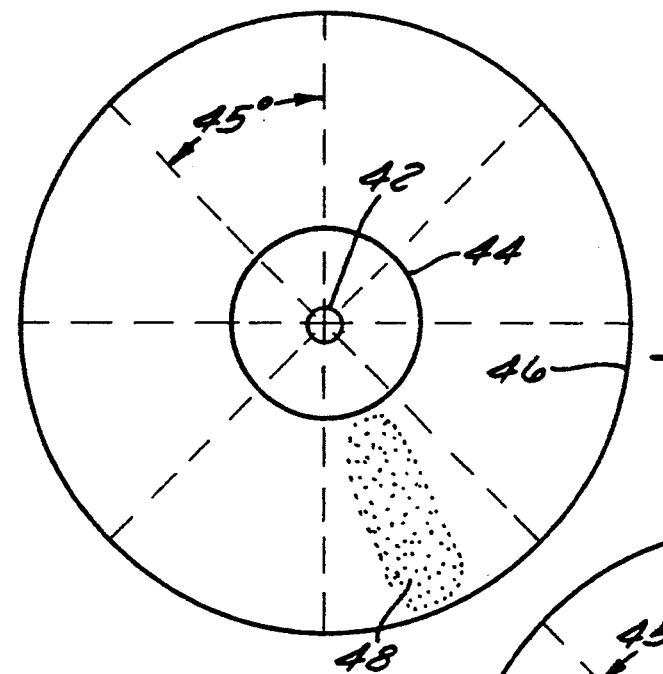
FIGS. 8A and 8B diagrammatically illustrate fuel distribution in a combustion chamber for an 8-hole injector, FIG. 8A showing distribution for the invention and FIG. 8B showing conventional distribution.
Figure 8B:
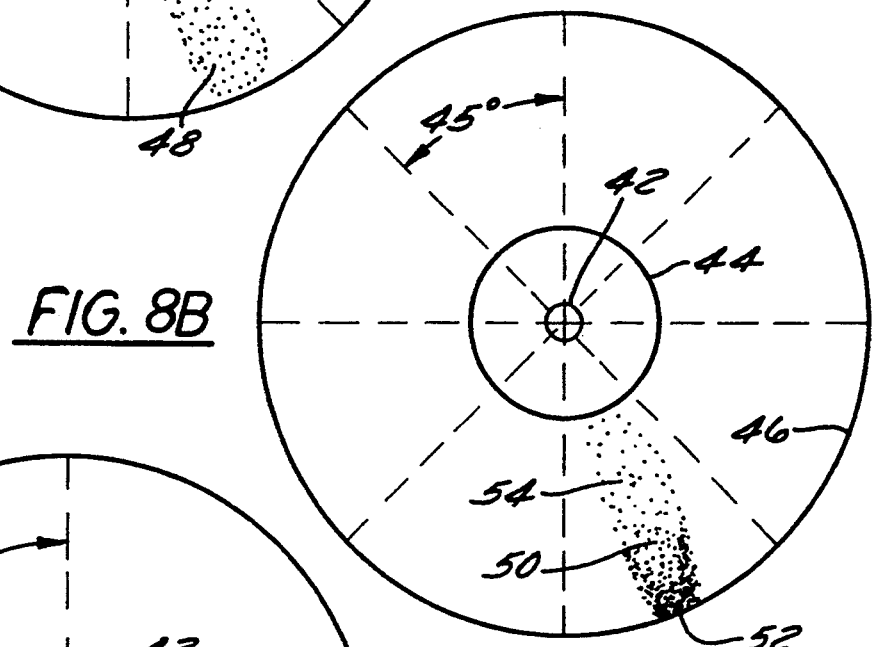

It is preferred to have at least eight equally spaced-apart holes in an ECIS-FADS injector tip, and accordingly dotted lines in each of FIGS. 8A and 8B divide the annular combustion chamber into 8 equal 45° wedges. A conventional spray will have a transverse spread of approximately 22.5°, so all of the jet sprays shown in FIGS. 8-10 have been shown with approximately a 22.5° transverse spread. In each of FIGS. 8-10, only one of the jet sprays is shown, although it is to be assumed that similar jet sprays are injected into all of the other wedges.

FIG. 8A illustrates an ECIS-FADS expanding cloud spray 48 which has reached full expansion and has stopped short of the outer combustion chamber wall 46. All of the fuel in the spray 48 is available for fast air diffusion burning because of the uniform air/fuel distribution, so with each of 8 ECIS-FADS sprays 48 filling substantially half of its respective 45° wedge of the combustion chamber, a full 50 percent of the combustion chamber will be filled with burnable fuel. In fact, a great deal more than 50 percent of the combustion chamber will be filled with burnable fuel, because there is greater lateral spread for an expanding cloud ECIS-FADS spray than the usual approximately 22.5 percent spread for a conventional spray due to the virtually explosive disintegration of the plume caused by the rapidly falling injection velocity and short duration.

FIG. 8B illustrates a conventional spray plume wherein the plume was compressing during and after the injection event, with a large percentage of the droplets colliding and coalescing into larger droplets the momentum of which carries them radially outwardly to proximate the outer combustion chamber wall 46 and onto the outer wall 46. Thus, the head portion 52 of plume 50 is seen to have a very high concentration of fuel, much of which will not have sufficient available air in that region for burning (i.e., too rich); while the tail portion 54 of plume 50 is seen to have a very low concentration of fuel, generally too lean for proper burning. Thus, although the lateral spread of the conventional plume 50 may be approximately 22.5°, only approximately half of the fuel in plume 50 is available for proper burning, so that only approximately 25 percent of the combustion chamber has fuel available for proper combustion.

Figure 9A:
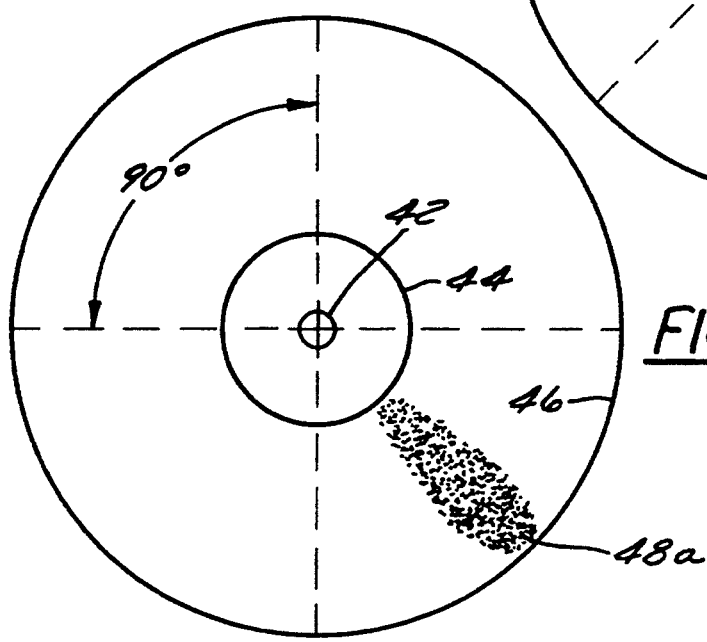
FIGS. 9A and 9B are similar to FIGS. 8A and 8B, except they are for a 4-hole injector.
Figure 9B:
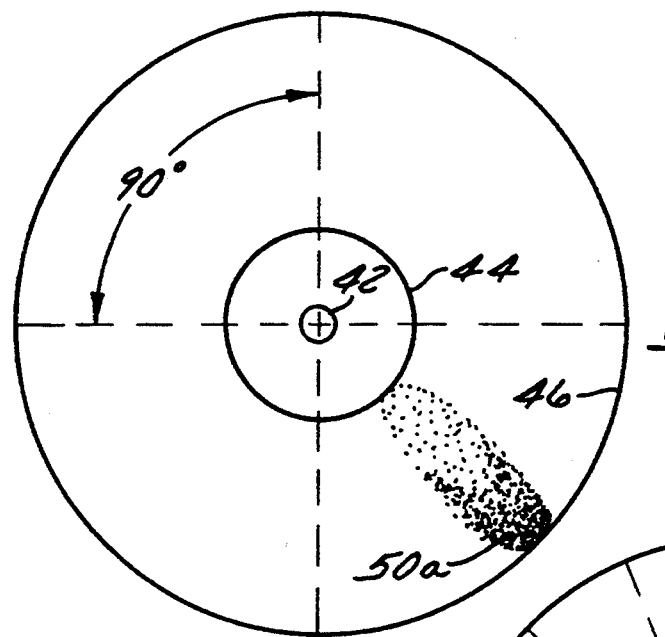

FIGS. 9A and 9B make the same comparison between an ECIS-FADS jet spray and a conventional jet spray, but for a conventional 4-hole injector tip. Thus, with a 22.5° spread of each plume, it will cover only approximately one-quarter of its respective 90° wedge. In this case, the four ECIS-FADS spray plumes 48a will fill the combustion chamber with more than 25 percent of a proper fuel dispersion for fast diffusion burning, while the conventional spray plume 50a will fill only approximately 12.5 percent of the combustion chamber with a proper dispersion of fuel for good combustion.

Figure 10A:
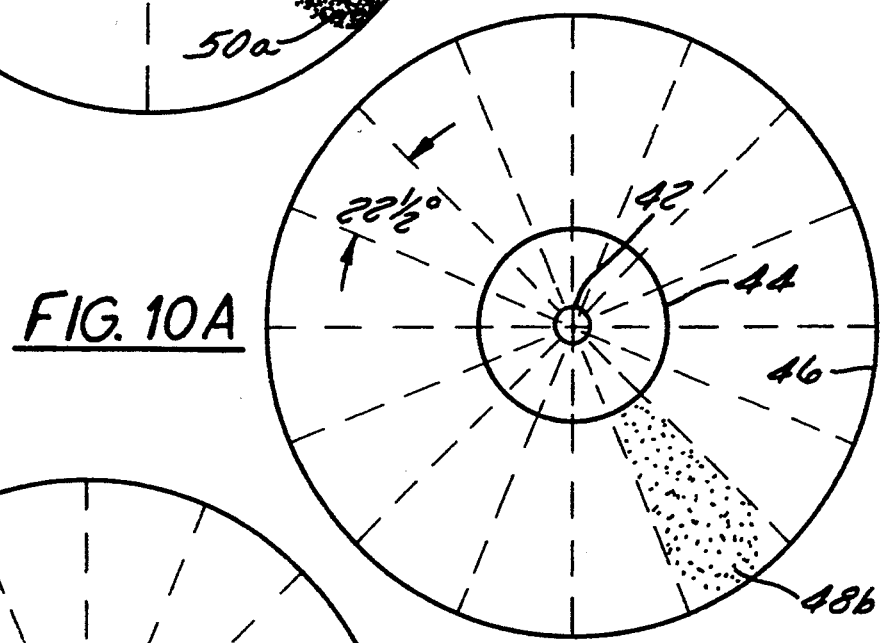
FIGS. 10A and 10B are similar to FIGS. 8A and 8B and 9A and 9B, except they are for a 16-hole injector.
Figure 10B:
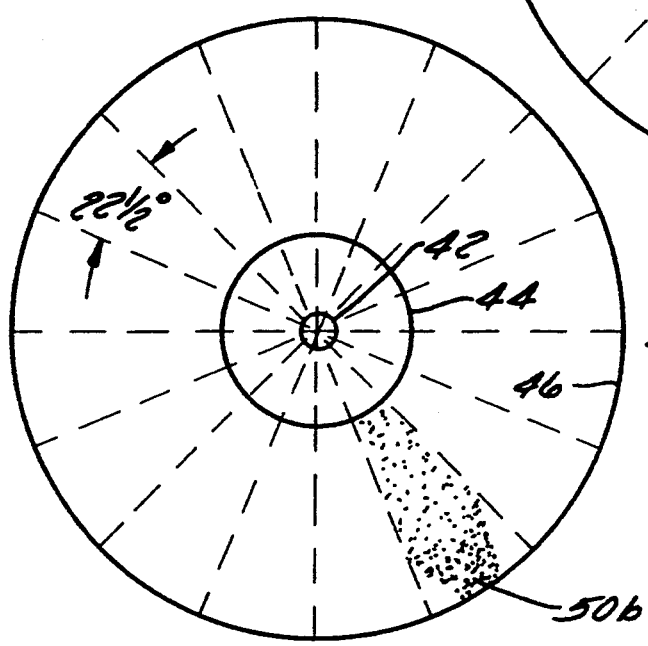

FIGS. 10A and 10B make this same comparison between an ECIS-FADS injection and a conventional injection for a 16-hole injector tip. In this case, the ECIS-FADS spray plumes 48b will substantially completely fill 100 percent of the combustion chamber with a proper dispersion of fuel for fast diffusion burning, but the conventional spray plumes 50b will only fill approximately 50 percent of the combustion chamber with a proper dispersion of fuel for good combustion. With a 16-hole injector tip, broadening of the dispersion beyond approximately 22.5° for each spray plume resulting from the ECIS-FADS rapidly falling velocity will improve air/fuel mixing for optimum combustion.

Accumulator Injection

The only practical way of which applicant is presently aware to produce the rapidly falling jet exit velocity during a very short injection period as required for the ECIS-FADS system is to utilize an accumulator-type injector. The high pressure required for the high initial injection velocity must be ready at the nozzle tip at the start of injection. There is no time to put other injection machinery in motion without an overly long startup time which would preclude the rapidly falling velocity and very short injection period required for ECIS-FADS. The accumulator-type injector inherently has the characteristic required for the ECIS-FADS system of a falling velocity during the injection event. With an accumulator-type injector, the injection pressure falls as a square function, and the injection velocity falls as a square root function of pressure so that the velocity fall is essentially a straight-line function, or uniform during the injection event.

However, accumulator-type injectors have never become accepted in the art, and the art has gone in the opposite direction to generally constant velocity injection or even rising velocity injection. The reason is that those in the art have for many years generally believed, and currently still generally believe, that to inject fuel rapidly during the beginning of the injection event will cause detonation, excessive pressure rise, and excessive peak pressures. Prior art accumulators had such a relatively long injection period and relatively slowly falling velocity as to produce injection plumes which had essentially the same characteristics as constant velocity, long-duration injection plumes, resulting in droplet agglomeration, heavy concentration of fuel at the tip, and a lot of wall wetting. With the long duration of injection, the accumulator-type injector actually worsened both the Phase I premixed burning problem and the Phase III liquid fuel and wall wetting combustion problem because more of the fuel was injected at the head of the plume at much too early a crank angle in the cycle.

Any prior art-type accumulator may be employed to perform the ECIS-FADS injection, but the nozzle must be considerably different from prior art accumulator injectors, with a much larger cumulative injection hole area, a much larger needle valve opening seat area, and a much larger sac area to enable the very rapid injection period and very rapid drop in velocity required for ECIS-FADS. Also, a very lightweight needle is required for very rapid opening and closing phases of the injection event so that most of the injection event is in fact characterized by the rapidly falling velocity. Finally, needle damping not found in prior art accumulator injectors is desirable at the ends of both the opening and closing strokes of the needle to prevent the needle from bouncing, which would cause undesirable fluctuations of the rapidly falling injection velocity in the beginning part of the jet stream from the opening event and could cause reopening after the end of the injection event, with the injection of additional unwanted and poorly atomized fuel, and possibly even shock waves.

Examples of accumulator-type injectors which would be suitable for the present ECIS-FADS system if suitably modified are those disclosed in Falberg U.S. Pat. Nos. 2,985,378, Berchtold 4,566,416, Loyd 4,414,940, Beck et al. 4,628,881, and a 1957 publication by Hooker in the Volume 65, 1957 issue of "SAE Transactions," pages 293–330, and particularly at pages 316–317.

Summary Comparison Between ECIS-FADS and Prior Art

In view of the foregoing, it will be appreciated that the ECIS-FADS fuel injection system has the following fundamental differences from the prior art:

1. With ECIS-FADS, a rapidly expanding fuel vapor cloud is created that expands and disintegrates the liquid core and disperses the fuel in the combustion chamber very soon after the end of injection. The prior art creates a compressing cloud requiring a long duration for dispersal.

2. With ECIS-FADS, a fuel cloud is created within which the fuel is substantially uniformly dispersed, with the volume of the cloud varying with the quantity of fuel injected to maintain a combustible mixture within the combustion chamber and to prevent overmixing or lean misfire. The prior art does not uniformly disperse the fuel, but to the contrary, is too rich at the tip and too lean at the tail.

3. With ECIS-FADS, a fuel spray is created the characteristics of which are controlled primarily by the jet exit conditions at the spray holes and such that each portion of the fuel spray cloud is created by the time history of rapidly falling jet exit velocity. For example, with high initial velocity followed by rapidly decreasing velocity, a large cloud is created by the tip of the initial spray followed by clouds of decreasing volume and decreasing distance from the spray nozzle for the following portions of the spray. The prior art does not control and tailor the jet exit velocity, but largely "takes what it gets."

4. With ECIS-FADS, substantially all of the combustion is efficient Phase II fast diffusion burning of liquid fuel droplets. The prior art burns too fast at the beginning of combustion with Phase I premixed burning, and too slow toward the end of combustion with Phase III large liquid fuel droplets and wall wetting combustion.

5. With ECIS-FADS, overall combustion efficiency and hence engine efficiency are greatly improved over prior art injection systems by substantially eliminating the premixed charge phase of combustion, accelerating the air diffusion phase, and substantially eliminating wall wetting, liquid diffusion, and avoiding burning and spraying fuel into burning or burnt gases.

Table of Physical Limits Defining ECIS-FADS

The following table provides approximate limits to be followed in order to assure that an injection system has the desirable ECIS-FADS characteristics. Some of the limits set forth in this table are alternatives presented in order to facilitate practicing of the present invention by those skilled in the art.

Where applicable, all values apply to maximum fuel quantity and maximum rated speed.

Definitions of the abbreviations are set forth at the end of the table.

Column I sets forth 22 physical limits by which the ECIS-FADS system may be defined. Column II gives the approximate outer physical limit for the ECIS-FADS system. Column III gives the approximate presently preferred physical limits for the ECIS-FADS system. Column 4 gives approximate limits presently considered to be ideal and hence most preferred for the ECIS-FADS system.

| Physical Limit | OK for ECIS-FADS | Preferred ECIS-FADS | Ideal ECIS-FADS |
| --- | --- | --- | --- |
| 1. Asac/Aholes | >1.0 | >1.2 | >2.0 |
| 2. Dsac/Dbore | >0.015 | >0.015 | >0.020 |
| 3. Aseat/Aholes | >1.0 | >1.2 | >2.0 |
| 4. Qmax/Aholes | <1.6 Db | <1.6 Db | <1.0 Db |
| 5. Aholes/Abore | >0.8:10,000 | >0.8:10,000 | >1.0:10,000 |
| 6. Ujmax (2t-dur) | <2.0 Db | <2.0 Db | <1.6 Db |
| 7. t-dur, msec | <0.8 Djeff | <0.08 Djeff | <0.5 Djeff |
| 8. t-dur, msec | <0.008 Db | <0.008 Db | <0.005 Db |
| 9. t-dur, deg c.a. | <15 | <10 | <6 |
| 10. −dUj/dt, m/sec$^2$ | >150,000 | >200,000 | >600,000 |
| 11. −dUj/dt, m/sec$^2$ | >600 Ujmax | >800 Ujmax | >1500 Ujmax |
| 12. Tip penetration | <0.5 Db | <0.5 Db | <0.4 Db |
| 13. Start of injection deg c.a. | <15° BTDC | <10° BTDC | <5° BTDC |
| 14. End of injection deg c.a. | <5° ATDC | <5° ATDC | <3° ATDC |
| 15. Fuel atomized and vaporized | <10% | <10% | <5% |

| Physical Limit | OK for ECIS-FADS | Preferred ECIS-FADS | Ideal ECIS-FADS |
|---|---|---|---|
| at end of injection | | | |
| 16. $-dU_j/dt > dU_{tip}/dt$ | >1.0 | >1.0 | >2.0 |
| 17. $d/dt\,(dU_j/dt)$ | <50% | <50% | <5% |
| 18. Fuel impingement on wall, maximum | <10% | <5% | 0% |
| 19. Radial distribution of fuel | uniform | uniform | uniform |
| 20. 80% atomized and mixed in deg c.a. | <30° | <30° | <12° |
| 21. Liquid core disintegrates-breakup time c.a. | <30° | <30° | <12° |
| 22. Spray of fuel into burnt/ burning gases | | minimal or neglibible | |

Definition of Abbreviations

Asac. The sac is the hole that feeds the spray holes. Asac is the area of the sac transverse to the axis of the injector needle, and is pi d² sac/4.

Dsac is the diameter of the sac.

Dbore is the diameter of the cylinder bore.

Aseat is the cross-sectional area of the injector needle valve seat. This can be approximated by pi times Dsac times needle lift/2 for a 60° needle, which is conventional.

Aholes is the summation of the cross-sectional areas of the plurality of injector holes or orifices in the injctor tip.

Qmax is the amount of fuel injected at maximum power and speed.

Abore is the cross-sectional area of the cylinder bore.

Ujmax is the maximum jet exit velocity from the spray holes, which is at the beginning of injection.

t-dur is time duration of the injection event.

msec is milliseconds.

Djeff is the effective diameter of the summation of the spray holes, which is the square root of 4 times Aholes/pi deg c.a. is degrees crank angle.

$-dU_j/dt$, m/sec² is rate of falling velocity in meters per second squared.

$dU_{tip}/dt$ is the rate of falling velocity of the tip of the injected spray plume.

$d/dt(dU_j/dt)$ is the rate of change of rate of falling velocity from a uniform, straight-line decrease in the velocity during the injection event.

A number of the above physical limits which relate to length of penetration of the plume, and hence to avoidance of wall wetting, were developed from test data obtained from injections in air at one atmosphere. These include physical limits nos. 5–9. For application to an engine, such limits should be normalized according to the density of the atmosphere within the combustion chamber, which for the ECIS-FADS injection that is very close to top dead center will be approximately the compression ratio. Tip penetration decreases approximately in accordance with the square root of the compression ratio, or the square root of P0/P, where P0 represents the density of atmospheric air and P represents the density of air in the combustion chamber. Thus, for a 16:1 compression ratio, the normalization factor would be the square root of 16 or 4, so that the tip penetration indicated by the physical limits in the above table would be normalized or reduced by a factor of 4. For a compression ratio of 12, the normalization factor would be 3.46, and for a compression ratio of 10, the normalization factor would be 3.16.

Physical limits 10 and 11 given in the table above apply particularly to engines having a cylinder bore of 100 millimeters or less, or which have a displacement of approximately 1 liter per cylinder or less. The rate of falling velocity may be less for larger engines, and this difference can be normalized by multiplying the physical limits given for $-dU_j/dt$ in meters per second squared by 100/Db.

As stated above, there is no upper limit to the rapidly falling injection velocity of the ECIS-FADS system. Decelerations of the spray during the injection event will typically range from about 200,000 to about 1,000,000 meters per second squared. The powerful dynamic force this represents for breaking apart, atomizing and distributing the fuel in an expanding cloud can be appreciated when one recognizes that this declaration range is 20,000–100,000 times the acceleration of gravity.

Logic for Physical Limits

1. Asac/Aholes > 1.0, preferred > 1.2, ideal > 2.0

The beneficial characteristics of the ECIS-FADS-type spray critically depends upon the velocity at the nozzle outlet, which depends directly upon the pressure drop across the outlet orifice. Consequently, it is necessary to control the dimensions of all restrictive passages in the injector between the source and the jet spray exit, and the cross-sectional area of the sac is one of the potential restrictions. Since the flow coefficient of the sac may be slightly higher than that of the holes, it may be practical to attain effective nozzle performance when the Asac/Ahole cross-sectional area is approximately equal to the total spray hole area. However, it is preferable to control the Asac/Ahole area to be at least approximately 1.2, and most preferred that it be approximately 2.0.

In order to obtain the very short duration and rapidly falling velocity of the ECIS-FADS system, the total spray hole area is required to be much larger than that of prior art systems, generally by a factor of about 3, and therefore the area of the sac is similarly required to be much larger than that found in prior art systems.

2. Dsac/Dbore>0.015, preferred>0.015, ideal>0.020

Since a relationship has been established in limit #1 between Asac and Aholes, and a relationship is established in limit #5 between Aholes and Abore, it is useful to also have a range of ratios between the sac and bore diameters. The numerical values selected are compatible with limits 1 and 5, and also with limit #8 which relates time duration to the diameter of the bore.

3. Aseat/Aholes>1.0, preferred>1.2, ideal>2.0

The same logic prevails for the area of the seat as for the area of the sac, since the needle valve seat is one of the potential restrictions upstream of the holes.

4. Qmax/Aholes<1.6 Db, preferred<1.6 Db, ideal<1.0 Db

The ratio of Qmax/Aholes is a very simple, well-defined and useful design parameter to ensure that the penetration length and injection duration are suitably short in value and the rate of falling velocity is sufficiently high to provide the ECIS-FADS effect.

Although this ratio has the dimensions of length and would appear to be the calculated length of a liquid fuel filament, it is not intended to serve as a precise projection of the jet spray penetration or plume length. The actual penetration length will be dependent on the compression ratio, jet velocity, rate of change of jet exit velocity with time, rate of change of jet exit velocity with transverse distance, rate of change of jet exit velocity with direction, spray hole diameter, fuel temperature, fuel viscosity, and fuel vapor pressure.

5. Aholes/Abore>0.8:10,000, preferred>0.8:10,000, ideal>1.0:10,000

This ratio is one of pure geometry, independent of fuel quantity. This is an important ratio for the ECIS-FADS system, enabling the very short injection duration and rapidly falling injection velocity.

6. Ujmax (2t-dur)<2.0 Db, preferred<2.0 Db, ideal<1.6 Db

Applicant has found by experimentation that the product of Ujmax and twice the duration time of injection is approximately equal to the spray penetration length in air at 1 atmosphere for the very short duration, rapidly falling velocity ECIS-FADS injections. A typical diesel engine with a compression ratio of 16 will cause a reduction in spray penetration by a factor of approximately 4. Consequently, a penetration of less than approximately 2.0 diameters at 1 atmosphere will become less than approximately 0.5 diameters in the engine such that the spray will not wet the cylinder wall. In the ideal case, the penetration of less than approximately 1.6 diameters at 1 atmosphere will become less than approximately 0.4 diameters in the engine, such that the spray can fill a piston-defined combustion chamber of diameter 0.4 Db without wetting the wall.

7. t-dur, msec<0.8 Djeff, preferred<0.8 Djeff, ideal<0.5 Djeff

The logic of the selection of this ratio is to enable the ECIS-FADS effect to be scaled for application to engines of all sizes. This relationship was initially derived from a diesel engine of 100 millimeter bore diameter and 130 millimeter stroke, or slightly over 1 liter in displacement. The relationship nevertheless applies to engines of all sizes. This physical limit assures the very short duration, rapidly falling velocity ECIS-FADS-type fuel injection, with the logic presented above for limit #5 also prevailing here.

8. t-dur, msec<0.008 Db, preferred<0.008Db, ideal<0.005 Db

The same logic prevails here as for limits 5 and 7 as set forth above.

9. t-dur, deg c.a.<15, preferred<10, ideal<6

The number of degrees of crank angle spanned during the injection event is another way of stating time duration, and the logic for limits 5, 7 and 8 also applies here.

10. -dUj/dt, m/sec²>150,000, preferred>200,000, ideal>600,000

These are the preferred rates of falling velocity which, coupled with the very fast injection, is a primary force in creating the ECIS-FADS effect. The magnitude of this falling velocity is selected to minimize droplet collision and coalescence and to maximize breakup of fuel jet and rapid atomization and vaporization in the resulting expanding cloud. There is no limit on the maximum desirable rate of fall in velocity, and the greater the rate of fall in velocity, the more pronounced will be the ECIS-FADS effect. The rates given in physical limit #10 are for diesel engines. Much lower rates of falling velocity are acceptable for gasoline engines because of the far greater volatility of gasoline than diesel fuel. Thus, while the lower limit for diesel fuel is a -dUj/dt of approximately 150,000 meters per second squared, for gasoline it will be approximately 50,000 meters per second squared.

The Blue Angel injection illustrated in FIGS. 1A-C had a falling injection velocity of 800,000 meters per second squared.

Since opening and closing velocities are determined respectively by opening and closing accumulator chamber pressures, the following chart will be helpful to those skilled in the art in selecting opening and closing velocities which, coupled with a selected time duration of injection, will produce the desired rate of falling velocity. The figures given are approximations.

| Pressure (psi) | Velocity (meters per second) |
| --- | --- |
| 25,000 psi | 400 m/sec |
| 22,500 psi | 360 m/sec |
| 10,000 psi | 240 m/sec |
| 2,500 psi | 120 m/sec |
| 2,000 psi | 100 m/sec |

11. -dUj/dt, m/sec²>600 Ujmax,. preferred>800 Ujmax, ideal>1500 Ujmax

This is another convenient way of defining the falling velocity limits for producing the ECIS-FADS effect. As an example, the Blue Angel injection shown in FIGS. 1A-C had a rate of falling velocity approximately 1900 times the initial, maximum injection velocity.

12. Tip penetration<0.5 Db, preferred<0.5 Db, ideal<0.4 Db

The same logic holds true for this physical limit as for limit #6.

13. Start of injection<15 BTDC, preferred<10 BTDC, ideal<5 BTDC

For ECIS-FADS, with its very fast injection, it is possible and desirable to delay injections to less than 15° before top dead center, preferably to less than 10° before top dead center, and most preferably to less than 5° before top dead center, eliminating Phase I premixed burning and enabling substantially all of the combustion to be Phase II diffusion burning.

14. End of injection<5° ATDC, preferred<5° ATDC, ideal<3° ATDC

Ending the injection event less than approximately 5° after top dead center, and most preferably less than approximately 3° after top dead center, is an important factor of the ECIS-FADS system ensuring against Phase III liquid fuel and wall wetting combustion.

15. Fuel atomized and vaporized at end of injection <10%, preferred <10%, ideal <5%

In ECIS-FADS, the very short time duration, rapidly falling velocity, and hole configuration can be coordinated to provide a pilot premixed charge of not more than approximately 10 percent, and preferably not more than approximately 5 percent which is ready to burn, followed by rapid Phase II diffusion burning of the remaining charge, giving a two-stage combustion with a "soft" beginning. This is in contrast to prior art fuel injection which will usually have from 30–80 percent of the fuel atomized and vaporized at the end of injection, with a large amount of premixed burning and resulting excessively high temperatures and peak cylinder pressure, high noise level, and excessive oxides of nitrogen emissions.

16. $-dU_j/dt > dU_{tip}/dt$, >1.0, preferred >1.0, ideal >2.0

This means that the rate of falling velocity of the jet as it is injected is greater than the rate of falling velocity of the tip of the plume, and preferably more than approximately twice the rate of falling velocity of the tip of the plume. This assures the development of the expanding cloud phase of the ECIS-FADS injection. The expanding cloud causes elements of the fuel spray to very rapidly separate in time and distance, resulting in fast dispersion and atomization. Conventional prior art fuel sprays are effectively constant or rising velocity, and the slowing down of the tip of the plume or dU-tip/dt enables the tail of the plume to catch up and cause droplet collision and coalescence, resulting in large droplet size and a large amount of wall wetting.

17. $d/dt(dU_j/dt) < 50\%$, preferred <50%, ideal <5%

With the accumulator-type injector employed for creating the ECIS-FADS effect, the rate of fall of velocity is very nearly constant with the unconventionally large total injector hole area and lack of interference with the free flow of fuel through the holes by having unconventionally large sac and seat areas, enabling the rate of falling velocity to be very rapid and the injection duration to be very short.

With the rate of falling velocity having less than a 50 percent variation, a good expanding cloud will be produced, and with the rate of falling velocity having less than approximately a 5 percent variation during the injection period, an ideal expanding cloud will be produced.

18. Fuel impingement on wall <10%, preferred <0.5%, ideal 0

The objective of the ECIS-FADS system is to rapidly inject, disperse, and vaporize the fuel within the combustion chamber uniformly and without wetting the walls. With the "expanding cloud injection spray" of the invention, wall wetting is greatly diminished and can be eliminated, enabling most or all of the combustion to be confined to the gas spaces without a liquid film diffusion flame from the wall. Whereas for ECIS-FADS, there is less than 10 percent fuel impingement on the wall, preferably less than 5 percent, and preferably no fuel on the wall, for conventional prior art engines of less than about 2.5 liters per cylinder displacement, more than 20 percent of the liquid fuel impinges on the wall, and this percentage rises rapidly as engine displacement per cylinder size decreases below about 2.5 liters, as indicated by curve 38 in FIG. 7.

19. Radial distribution of fuel uniform

The fuel distribution achieved by the ECIS-FADS system is substantially uniform in the combustion chamber, as will be seen from a detailed analysis set forth hereinafter.

20. 80% atomized and mixed in degrees c.a. <30° preferred <30°, ideal <12°

For the fast diffusion Phase II-type burning characteristic of the ECIS-FADS system, it is preferred that at least about 80 percent of the fuel be atomized and mixed and thereby burnable as liquid droplets in less than 30° crank angle, and most preferably in less than 12° crank angle, for the most efficient diffusion burning. With conventional prior art injection, 80 percent of the fuel requires greater than 45° crank angle, with accompanying inefficient liquid fuel and wall wetting combustion.

21. Liquid core disintegrates—breakup time c.a. <30°, preferred <30°, ideal <12°

The same logic prevails here as for physical limit #20, and the breakup time for conventional prior art injector systems is greater than 45° crank angle.

22. Spray of fuel into burnt/burning gases minimal or negligible

With the ECIS-FADS system, substantially all of the fuel is rapidly injected prior to ignition, so little or no spray will be injected into burnt or burning gases with the present invention.

The only prior art of which applicant is aware where there was a deliberate attempt to shorten the time duration of an accumulator-type injector was that described in the above-referenced Hooker article in "SAE Transactions." However, from the limited information in the article, it is apparent that the physical characteristics of the injector described departed significantly from the physical limits tabulated above for the ECIS-FADS system so that a generally compressing spray would have been produced rather than an expanding cloud of the ECIS-FADS type. It is estimated from the information disclosed that more than 20 percent of the fuel injected was atomized and vaporized and that at least 20 percent of the fuel was impinging on the wall. Consequently, there would necessarily have been a significant portion of both Phase I premixed combustion and Phase III liquid fuel and wall wetting combustion, with probably less than 50 percent of the Phase II diffusion-type combustion. The possibility that an expanding cloud injection spray of the ECIS-FADS type with its benefits of substantial elimination of both Phase I premixed combustion and Phase III liquid fuel and wall wetting combustion was completely unrecognized in the Hooker article.

Needle Damping

It is necessary to employ a low mass, high speed injector needle to minimize the needle opening and closing times so that as much as possible of the injection event will have the rapidly and substantially uniformly falling velocity of the invention. Preferably not more than a total of approximately 10 percent of the time duration of injection will involve needle opening to 50 percent lift and closing from 50 percent lift. This is 5–10 times faster than conventional injector needle operation.

Such rapid needle operation is accomplished by three features. (1) A lightweight, low mass needle, this preferably being accomplished by employing a narrow needle shank. (2) A relatively large differential area of the needle utilized for hydraulic pressure opening of the needle. (3) A relatively strong needle closing spring.

In order to avoid needle bounce during the opening and closing events, it is necessary to damp the needle at the end of each of its opening and closing strokes. Means for accomplishing such opening and closing damping of the injector needle are illustrated in FIGS. 11-18 of the drawings.

Figure 11:
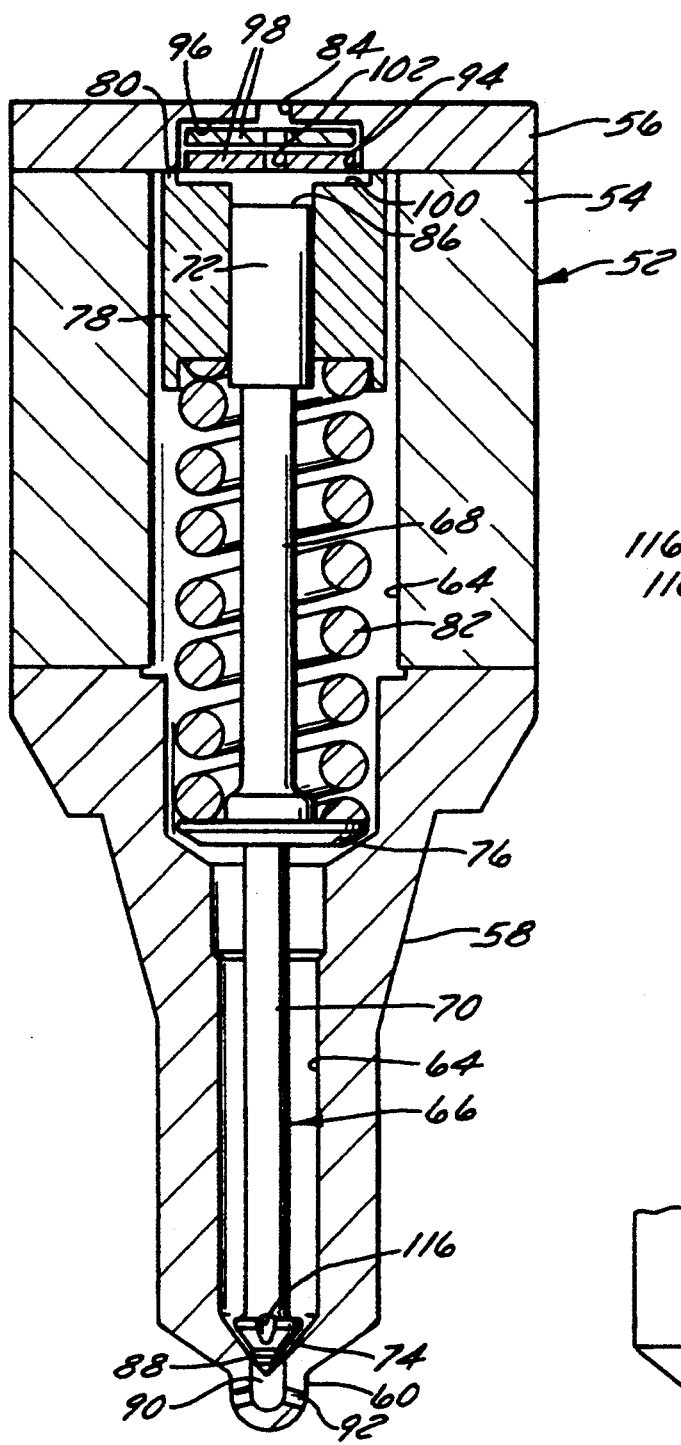
FIG. 11 is an axial sectional view, partly in elevation, illustrating an accumulator injector incorporating the needle damping means of the invention.

Referring at first to FIGS. 11-16, and at first primarily to FIG. 11, an accumulator injector generally designated 52 is illustrated. Injector 52 is generally of the type disclosed in the Falberg U.S. Pat. No. 2,985,378 except for the opening and closing damping means of the present invention, and also except for the fact that the total area of the injection holes, the sac, and the seat with the needle open are much larger in the injector 52 of the invention than they are in Falberg. Operation of accumulator injector 52 may be accomplished the same as in Falberg, or may be like that of any other accumulator-type injector, as for example the accumulator injectors disclosed in Berchtold U.S. Pat. Nos. 4,566,416, Loyd 4,414,940, Beck et al. 4,628,881, or the Hooker "SAE Transactions" publication referred to hereinabove.

Figure 14:
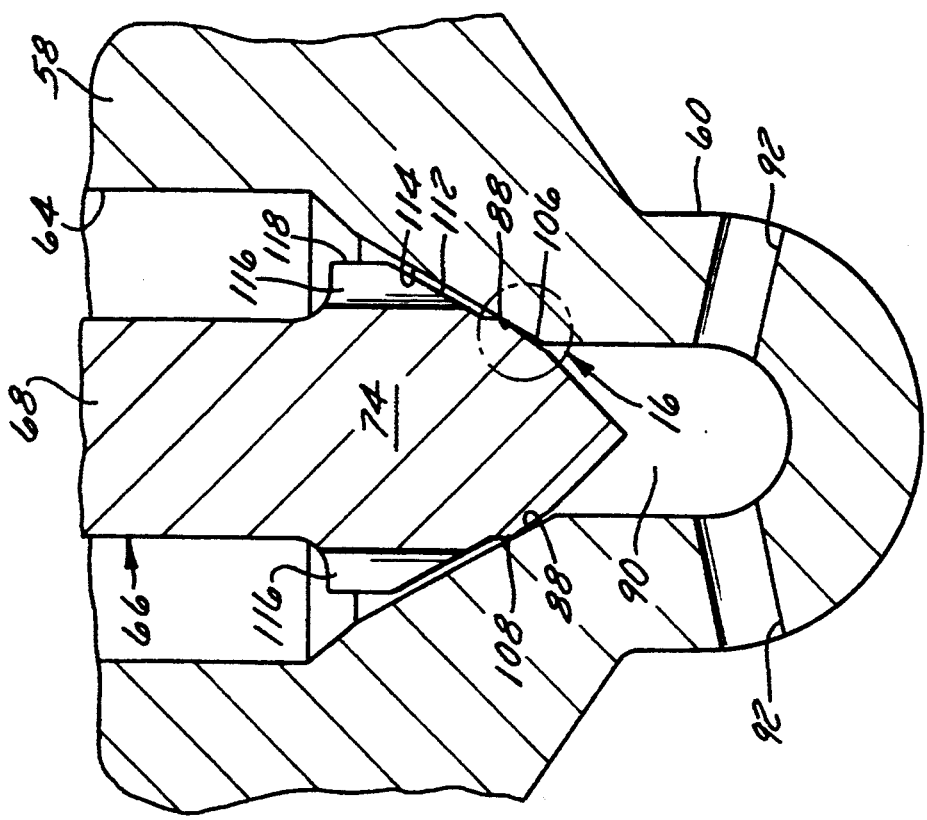
FIG. 14 is a greatly enlarged axial section of the tip portion of the injector shown in FIGS. 11-13, with the needle valve in its closed position.

The body of accumulator injector 52 includes a generally cylindrical upper barrel 54 with a top closure plate 56, and an annular lower body portion 58 which terminates at its lower end at the injection nozzle 60. The accumulator chamber is generally designated 64 and is defined within the upper barrel 54 and lower body portion 58. The needle is generally designated 66, and includes slender, lightweight upper and lower shank portions 68 and 70, an annularly enlarged cylindrical stem 72 at the upper end of upper shank portion 68, an enlarged annular valve tip portion 74 at the lower end of lower shank portion 70, and a radial flange 76 intermediate the shank portions 68 and 70. A cylindrical check valve element 78 has a sliding, fluid-tight fit over the needle stem 72, and has an axially oriented peripheral flange 80 adapted to engage against the lower surface of top closure plate 56 which serves as the check valve seat. A helical spring 82 is compressed between the top of needle flange 76 and the bottom of check valve element 78 so as to normally bias the needle 66 downwardly to its seated and closed position, and the check valve element 78 upwardly to its seated, closed position. These normally closed positions of needle 66 and check valve element 78 are illustrated in FIGS. 11 and 14.

Fuel is pumped into accumulator chamber 64 through axially centered fuel entry orifice 84 which extends through top closure plate 56 to achieve a fuel pressure within chamber 64 that will produce the desired high initial velocity of the rapidly falling injection velocity. Pumping pressure moves check valve element 78 downwardly off of its seat against the force of spring 82, and when the accumulator chamber fluid pressure approaches equalization with the pumping pressure, the spring 82 will again close check valve element 78. Injection is initiated by spilling fuel from the pressure line which feeds fuel entry orifice 84 to cause a sudden drop in fluid pressure against the top surface 86 of needle stem 72, at which time the much higher fluid pressure within accumulator chamber 64 rapidly moves the needle 66 from its closed position as shown in FIGS. 11 and 14 to its open position shown in FIG. 15. The opening event is caused by the net upward force of hydraulic pressure within chamber 64 against the differential area of the relatively larger cross-section of needle stem 72 than the relatively smaller seating area of needle tip portion 74. Compressed fuel is thus released through needle valve seat 88, sac 90, and spray holes 92 until the force of spring 82 overcomes the fluid pressure force against the aforesaid differential area of the needle, at which time the spring 82 rapidly moves the needle 66 downwardly in its closing stroke.

The strength of needle actuating spring 82, and the amount of the aforesaid differential needle area are selected such that the needle will rapidly close at a fluid pressure in accumulator chamber 64 which corresponds to the selected injection velocity defining the lower end of the rapidly falling velocity of the injection event.

The means providing damping in the opening direction forms part of the needle opening stop. A downwardly opening annular cavity 94 is axially located within top closure plate 56, being slightly smaller than check valve flange 80. One or more flat annular washer-like damping wafers 98 are freely axially shiftable within the annular cavity 94 and the contiguous cavity 100 in the upper end of check valve 78, the wafers 98 having central holes 102 admitting passage of fuel from the pressure source into accumulator chamber 64. When fuel is pumped through entry orifice 84 into chamber 64, the pressure differential will cause the damping wafers 98 to shift downwardly in cavities 94 and 100, and a film of fuel will develop between the wafers 98 and the flat upper stop surface 96 in closure plate 56, and if there is a plurality of the damping wafers 98 as illustrated in FIG. 11, such a fuel film will also be introduced between the adjacent wafers 98. Such fuel films will effectively damp the opening stroke of needle 66 by a squish damping effect when the upper end surface 86 of stem 72 strikes the damping wafer or wafers 98 and forces the wafer or wafers upwardly against the stop surface 96 in top plate 56.

A small amount of additional opening squish damping is provided between the top surface 86 of needle stem 72 and the bottom surface of the lower damping wafer 98.

Figure 12:
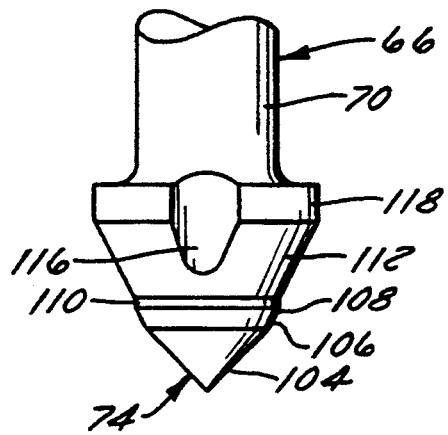
FIG. 12 is a greatly enlarged, fragmentary elevational view of the tip portion of the needle valve shown in FIG. 11.
Figure 13:
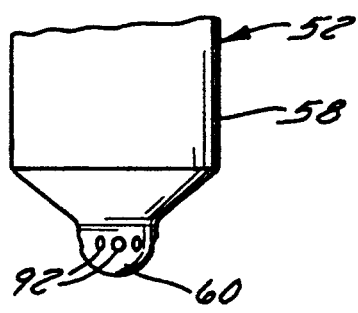
FIG. 13 is a fragmentary side elevational view of the lower end portion of the injector shown in FIG. 11.
Figure 15:
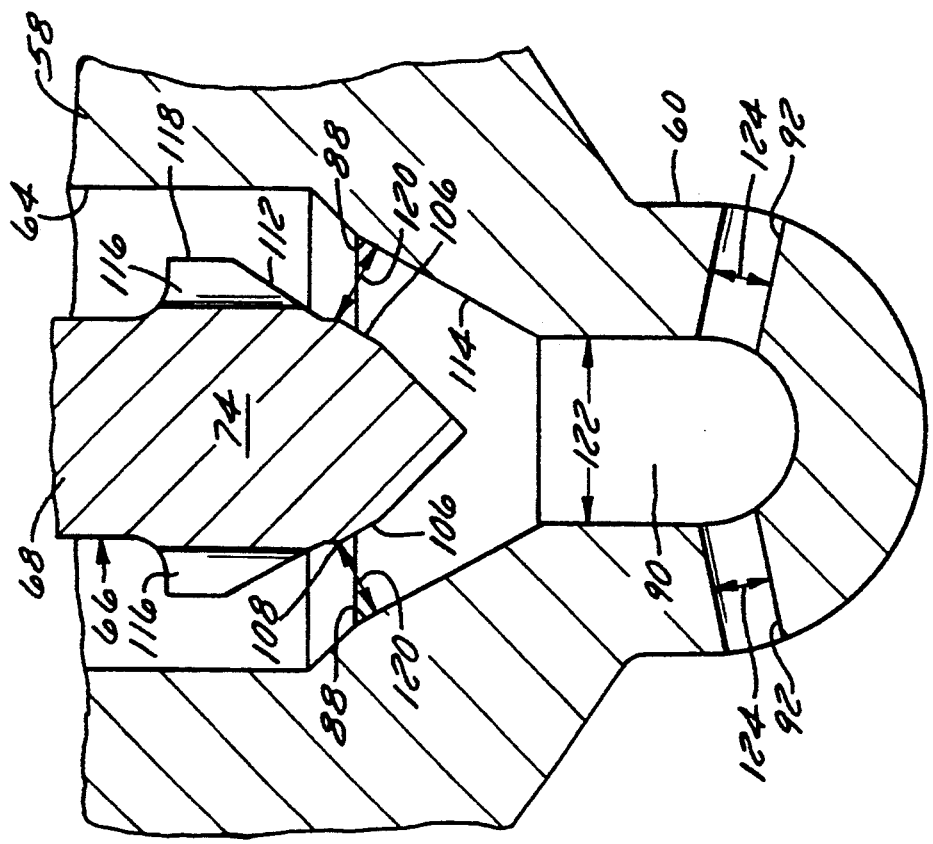
FIG. 15 is a view similar to FIG. 14 but with the needle valve in the open position, and illustrating the area of the seat, area-of the sac, and area of the holes.

Damping at the end of the needle closure stroke will now be described. FIG. 12 illustrates the detailed construction of the enlarged valve tip portion 74 of needle 66. The bottom or leading tip portion 104 of needle 66 has a conical configuration with a somewhat wider cone angle than the seating area for generally nonturbulent flow of the injected fuel from the region of valve seat 88 into the sac 90. Next up from leading portion 104 is the conical seating region 106 of needle tip portion 74 which has a slightly greater included angle than the valve seat itself so that seating actually occurs proximate the upper seating edge 108 of region 106 so as to provide a sharply defined seat area for establishing the aforesaid differential area upon which valve opening is based. Next upwardly from the seating edge 106 is a generally cylindrical relief area 110, and above that is an axially extensive conical damping surface 112 which preferably has the same included angle as a conical axial extension 114 of needle valve seat 88 as best illustrated in FIG. 14, and as also illustrated in FIGS. 11 and 15. If desired, there can be a slight included angle difference between the conical damping surface 112 on needle 66 and the conical seat extension 114, seat extension 114 representing a second conical damping surface which faces and is slightly spaced from needle damping surface 112. Needle tip damping surface 112 and seat damping surface 114 are preferably spaced apart in the range of from approximately 0.0005 inch to approximately 0.001 inch. Having this spacing too small could cause interference with the needle valve seating action, while having this spacing too large could result in insufficient damping for the high speed closing action of the needle.

At least one and preferably a series of regularly annularly spaced longitudinally oriented channels or scallops 116 are cut out of the valve tip portion 74. Channels or scallops 116 are preferably smoothly arcuately contoured in cross-section for minimization of fluid turbulence as fuel flows through them. Channels 116 extend from the top of enlarged needle tip portion 74 down to close to the relief area 110, and the purpose of channel or channels 116 is to enable full accumulator chamber pressure to be quickly channeled to valve seat 88 and needle seating edge 108 to assure full effectiveness of the aforesaid differential area in virtually instantaneously popping the needle valve open in response to the dumping of fluid pressure from above the upper end surface 86 of the needle. The longitudinal channels 116 thus enable the extremely quick needle opening action required for the very short duration ECIS-FADS injection event, while nevertheless leaving large opposing damping surface areas 112 and 114 for effective squish damping at the end of the needle closing stroke by partial entrapment of fuel between the damping surfaces 112 and 114.

The only limitation on the extent of the opposed damping surfaces 112 and 114 is the diameter of the lower part of accumulator chamber 64, and the need for having sufficient space between the wall of accumulator chamber 64 and the annular upper end portion 118 of needle tip portion 74.

In a presently preferred configuration of needle 66, there are four regularly spaced longitudinal channels or scallops 116 in the tip portion 74, and these leave four large opposing damping surfaces 112 and 114, the damping surface regions 112 on needle tip portion 74 appearing as four damping wings. Thus, as the needle valve closes, there is a large area of fuel film which must be displaced from between these wing surfaces 112 and the seat extension surface area 114 in order for the needle seating edge 108 to make metal-to-metal contact with valve seat 88.

In FIG. 15, which illustrates the needle valve in its fully opened position, arrows 120 indicate the annular area of the valve seat, arrows 122 indicate the cross-sectional area of the sac, and arrows 124 indicate the area of each individual spray hole. Arrows 120, 122 and 124 are to assure that the meaning of these terms is clear in the table of physical limits set forth hereinabove.

FIG. 16 is a large blowup of the encircled region of FIG. 14 illustrating the small differential between the cone angle of valve seat 88 and that of seating region 106 of needle tip 74. Typically the included cone angle for valve seat 88 will be 60°, and that of tip seating region 106, 61°. This very small differential angle clearly and precisely locates the actual seating at the upper seating edge 108 of tip seating region 106 for accurate definition of the cross-sectional area of seating in establishing the aforesaid differential area utilized to pop the valve open under the influence of accumulator pressure. With this slight differential angle between seating surfaces 88 and 106, although the seating area is determined by upper edge 108, elastic deformation of the metal will spread the seating force over a substantial area of the seat so as to minimize impact stresses in the seat and thereby avoiding fatigue failure and spalling of the seat edge, enabling the needle valve to achieve the high cycle life requirements for a fuel injector.

The squish damping of injector needle 66 and spreading of the needle valve closing impact and force over a substantial area while at the same time maintaining an accurate closure area line are similar to features disclosed for a ball poppet valve in applicant's copending application Ser. No. 830,000 filed Feb. 18, 1986, now abandoned, for "Ball Poppet Valve Seat Construction."

FIGS. 17 illustrates an alternative needle construction wherein the enlarged tip portion 74a of needle 66a is enlarged by means of a separate collar 126 which bears the conical tip damping surface 112a. Since the collar 126 does not contact any other surfaces, it does not need to be hard, and can be made of lightweight material such as aluminum, although it may be made of other metal such as brass or steel. Needle 74a of FIG. 17, or 74 of FIGS. 11–16, will normally be made of a hardened steel alloy.

FIG. 18 illustrates an alternative opening damper embodied in an accumulator injector generally designated 52b which has an upper barrel portion 54b with a top closure plate 56b having fuel entry orifice 84b extending centrally therethrough. The needle is generally designated 66b, and has enlarged cylindrical stem portion 72b at its upper end about which check valve element 78b slideably fits. Check valve 78b has peripheral lugs 128 near its upper end which slideably axially locate check valve element 78b and hence needle stem 72b within the accumulator chamber 64b defined in part within upper barrel portion 54b. Needle 66b has a radial flange 76b at the lower end of stem 72b against which an annular collar 130 seats, the collar 130 serving as a locator for the lower end of helical compression spring 82b which bears against a shoulder 132 on collar 130 to bias needle 66b downwardly toward its closed position. The upper end of spring 82b bears against a shoulder 134 on check valve element 78b to bias the latter upwardly toward its closed position.

When needle 76b shifts upwardly to its open position, there will be some squish damping between top surface 86b of needle stem 72b and the bottom surface of closure plate 56b, the closure plate 56b serving as the needle stop. However, primary squish damping is accomplished between a cylindrical lower end portion 136 of check valve element 78b and a radially slightly larger cylindrical cup 138 which has its inner radius defined by needle stem 72b, its outer radius defined by collar 130, and its bottom defined by needle flange 76b. As needle 66b moves upwardly toward its open position, the cup 138 moves upwardly over cylindrical portion 136 of check valve element 78b, and most of the liquid fuel in cup 138 must be displaced for the needle to reach its open position against the stop presented by top plate 56b, such liquid displacement providing the opening squish damping.

Means for Dispersing Jet Sprays

Figure 19:
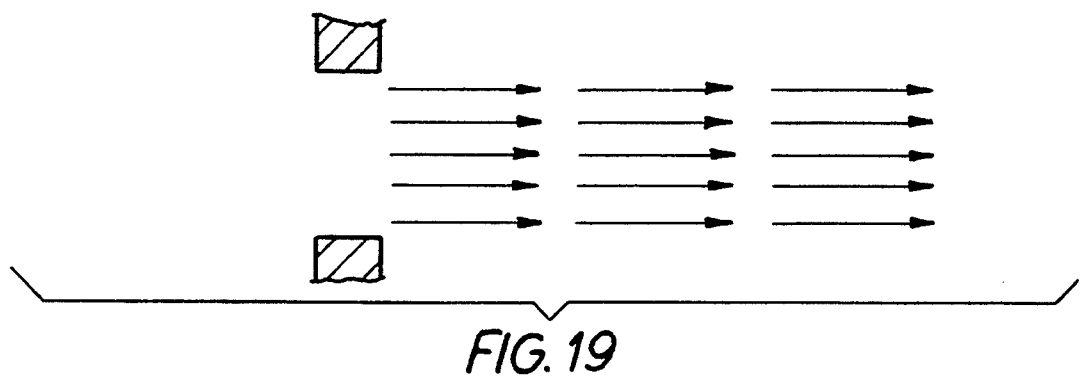
FIGS. 19–22 graphically illustrate the dispersion of jet sprays, FIG. 19 showing a laser jet-type spray with no substantial dispersion, FIG. 20 illustrating transverse velocity dispersion, FIG. 21 illustrating lateral dispersion by means of swirl vanes, and FIG. 22 illustrating axial dispersion by means of rapidly falling velocity according to the invention.

FIGS. 19–22 graphically illustrate the dispersion of jet sprays. FIG. 19 shows a laser jet-type spray through a very short orifice at constant velocity, with no substantial dispersion. Thus, the velocity vectors are constant and uniform with respect to time, direction and displacement.

Figure 20:
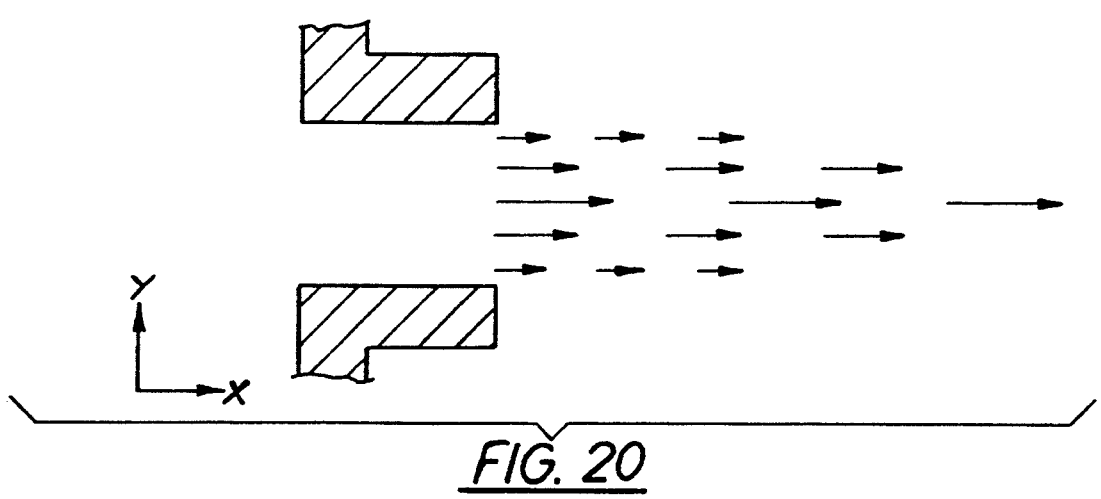

FIG. 20 also illustrates a constant velocity injection jet, but in this case, the injection orifice is relatively long, and friction between the orifice wall and the injected liquid slows down the forward velocity of the outer layers of liquid so as to cause a transverse dispersion. Thus, velocity vectors in this case are constant and uniform with respect to time, direction, and "X" displacement, but nonuniform with respect to "Y" displacement. It is this type of dispersion which applicant utilizes to control the amount of premixed pilot fuel that is in effect ripped off of the outer part of the injected stream. This control is achieved by adjustment of the length of the orifice relative to its diameter.

Figure 21:
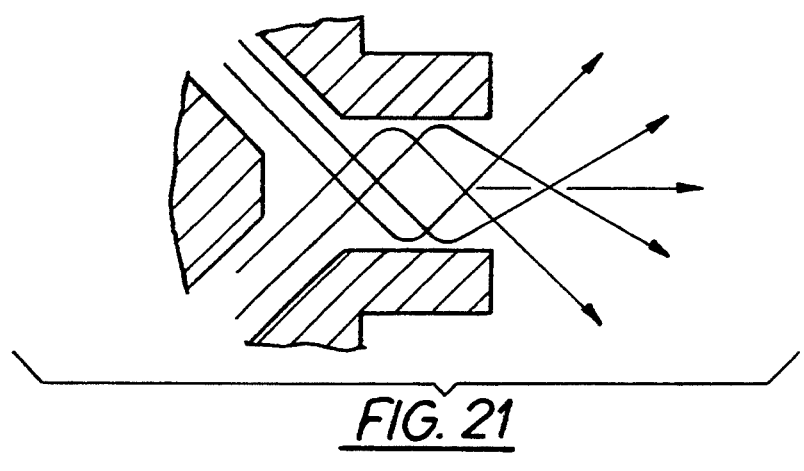

FIG. 21 illustrates the development of lateral dispersion by means of nonuniform velocity with respect to direction. This is one means to control the length of penetration of the plume, and can be accomplished by swirl vanes, which can either be placed on a collar or muff on the needle close to the needle valve head, or in the region where the sac would normally be downstream of the needle valve seat. It will be seen from FIG. 1 that conical spray elements have been developed and must separate laterally.

Figure 22:
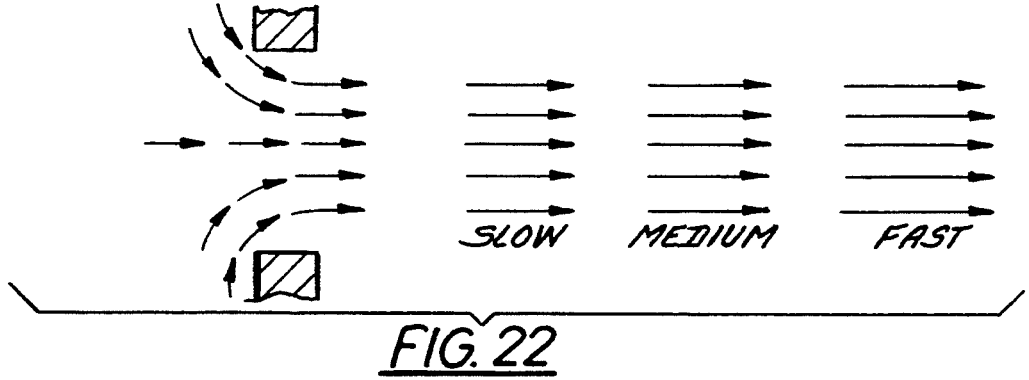
Figure 23:
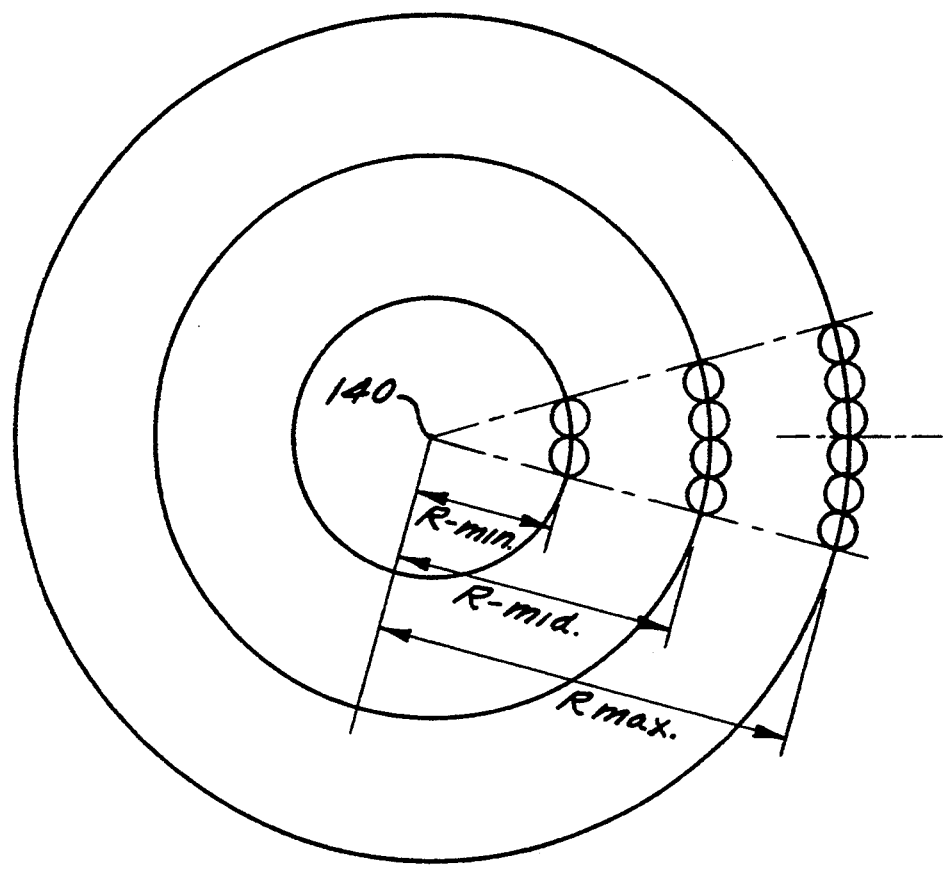
FIG. 23 diagrammatically illustrates the uniform air/fuel ratio achieved by the expanding cloud spray of the invention.
Figure 24:
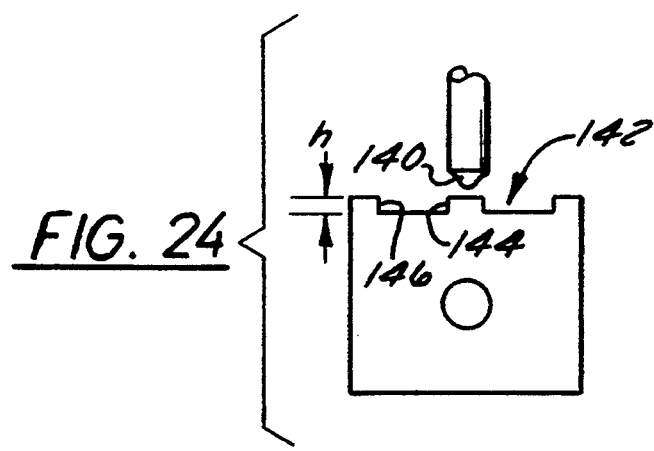
FIG. 24 is an elevational view diagrammatically illustrating a generally flat combustion chamber of uniform height.
Figure 25:
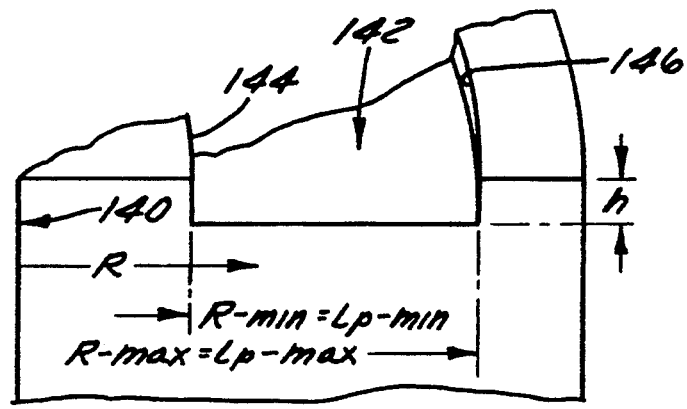
FIG. 25 illustrates the combustion chamber of FIG. 24 in fragmentary perspective.
Figure 26:
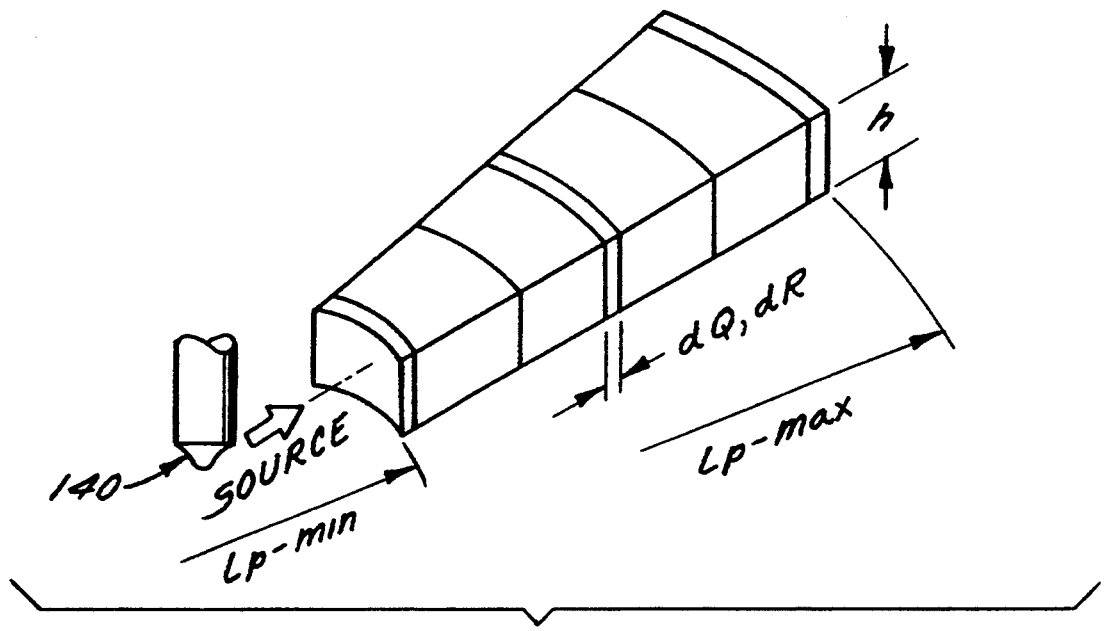
FIG. 26 is an isometric view illustrating the expanding cloud that is injected into a combustion chamber such as that shown in FIGS. 24 and 25.

FIG. 22 illustrates the most powerful means for developing jet spray dispersion, which is applicant's rapidly falling injection velocity or -dUj/dt which pulls the jet stream apart almost explosively. The separation is illustrated in the X or injection direction in FIG. 22, but as described in detail hereinabove, when the jet stream is pulled apart it also virtually explodes in lateral dispersion.

Fuel Dispersion Substantially Constant

The immediately following discussion and associated mathematics are based upon the approximation that for the very short duration, rapidly falling velocity ECIS-FADS injection, the length of penetration, Lp, of each ΔQ or dQ quantity of fuel is proportional to the injection velocity Uj of that ΔQ or dQ of fuel. The following discussion and mathematics are for a uniformly falling injection velocity from the beginning to the end of the injection event. With the rapidly falling velocity, the Lp of each ΔQ or dQ group of droplets is determined by its own initial velocity, because with the ECIS-FADS expanding cloud, none of the ΔQ or dQ groups of droplets interfere with any of the others as they are injected into and dispersed in the combustion chamber.

Each ΔQ or dQ per unit of time Δt or dt is also proportional in volume to the momentary velocity Uj at its time of injection, and with penetration Lp of ΔQ or dQ also proportional to momentary injection velocity Uj, that causes ΔQ or dQ to vary in volume directly proportionally to its injected distance Lp from the source injector.

This is diagrammatically illustrated in FIG. 23 which shows ΔQs at three uniformly spaced-apart radial distances from the injection source which is designated 140. At the minimum radial distance out from source 140, Rmin, ΔQ is represented by two droplets. At the second or middle radial distance out, Rmid, which is twice as far out from source 140 as Rmin, ΔQ is represented by four droplets. At the maximum radial distance out from source 140, Rmax, ΔQ is represented by six droplets. For a combustion chamber of uniform height h from Rmin out to Rmax, i.e., a generally flat annular combustion chamber, combustion chamber volume will vary directly in proportion to the radial distance out from the center of the combustion chamber, so the quantity of air in a combustion chamber extending from Rmin to Rmax will also vary directly in proportion to the radial distance out from the source 140 of injected fuel. With both ΔQ and Δair both proportional to the radial distance out from the source or centr 140, it follows that there will be a uniform air/fuel ratio in the combustion chamber.

FIGS. 24 and 25 diagrammatically illustrate such a generally flat combustion chamber of uniform height h, the combustion chamber being generally designated 142. In FIG. 25, the injection source is designated 140 as it is in FIG. 23, and the inner and outer walls of combustion chamber 142 are designated 144 and 146, respectively. Rmin equals Lpmin and Rmax equals Lpmax are designated in FIG. 25 as corresponding to the radial locations of inner wall 144 and outer wall 146, respectively, of combustion chamber 142.

FIG. 26 diagrammatically illustrates the ECIS-FADS expanded cloud from injection source 140 between Lpmin and Lpmax, with a uniform height h. ΔQ or dQ and ΔR or dR are diagrammatically indicated in FIG. 26.

Applicant has determined that the following three simplified expressions may be employed to generally approximate penetration length Lp, with the understanding that these expressions are tempered by viscosity, temperature, vapor pressure, and approximately the square root of the density ratio corresponding to compression ratio, the density ratio being applied as it was hereinabove with respect to the table of physical limits.

$$Lp = Uj2td \quad (td \text{ is time duration in milliseconds}) \qquad \text{I}$$

$$Lp = UjDj\left(3 + \frac{dUj/dt}{800{,}000}\right) \quad (Dj \text{ is jet diameter}) \qquad \text{II}$$

$$Lp = 700\,Dj \qquad \text{III}$$

These expressions are only applicable for the very short duration, rapidly falling velocity of the ECIS-FADS-type injection, and have no validity for conventional long duration injections. These expressions indicate penetration Lp is linearly proportional to both injection velocity Uj and time t.

The following mathematics prove that the air/fuel ratio is constant for the type of combustion chamber diagrammatically illustrated in FIGS. 23–25 where penetration length Lp is proportional to injection velocity Uj. $C_1$ and $C_2$ are constants. Millimeters is expressed as mm and meters per second is expressed as m/s.

Fuel Quantity:

$dQ = UjAjdt$

Fuel Location:

$R = c_1Uj$

Lp OC UjDj $dR - C_1\, dUj$

Volume of Combustion Chamber Space:

$V = (\pi R^2max - \pi R^2min)\, h$ $dV = 2\pi hRdR$

Relationship Between Uj and T for ECIS-FADS $dUj/dt = constant = C_2$

Relationship Between Combustion Chamber Volume and Fuel Quantity $$\frac{dV}{dQ} = \frac{2\pi h R dR}{U_j A_j dt}$$

Substituting $R = C\ U_j$ and $dR = C\ dU_j$ $$= \frac{2\pi h C_1{}^2 U_j(du)}{U_j A_j dt} = \frac{2\pi h C_1{}^2 U_j dU_j}{U_j A_j dt}$$

$$= \frac{2\pi h C_1{}^2 C}{A_j} = \frac{\text{constant}}{\text{or}}$$

$$\frac{dQ}{dV} = \frac{A_j}{2\pi h C_1{}^2 C_2} = \text{constant}$$

Therefore, air/fuel ratio is constant in the radial direction between Rmin and Rmax. Distribution of fuel and air in the circumferential direction will depend upon the number of spray holes, their angular relationship and the transverse dispersion of the ECIS-FADS fuel spray.

A specific example for the above is calculated below:

$R$bore = 50 mm
$U_j$max = 360 m/s
$U_j$min = 12 m/s
$U_j$avg = 240 m/s
$R$max = 36 mm
$R$min = 12 mm
$h$ = 14 mm
$Q$ = 100%
Total Vol. = $\pi(R\text{max}^2 - R\text{min}^2)h$
$A_o/p$ = 16

$$L_p = U_j D_5 \left[ 3 + \frac{dU_j/dt}{[800,000]} \right]$$

$D_j$ = 0.2 mm $$t = \frac{Q}{A_j U_j \text{avg}}$$

No. holes = 10
$td$ = 0.42
$\Delta td$ = 0.42/24

Volume of chamber: 50,670 mm³ Volume per 1% Q: 506.7 mm³

At Radius R, determine $\Delta Q$ per millimeter of radius $\Delta R$.

At Rmax:
Fuel Quantity per Equal Time Units:
$\Delta Q = U_j A_j \Delta t$
$\Delta t = 1/24\ t$-total
Fuel Location for $\Delta Q$:
$L_p = R = $ constant ($U_j$) initial
$\Delta R = 1/24\ (R\text{max} - R\text{min})$
Volume of Chamber into Which Fuel Is Injected:
$\Delta V = 2\pi h R \Delta R$ $$\frac{\Delta U}{\Delta t} = \text{constant}$$

$$\Delta Q = \frac{360\ (0.314)\ (0.42)\ (1/24)}{2\pi\ (14)\ (36)\ (1.0)}$$
$$= 6.25 \times 10^{-4}\ \text{mm}^3/\text{mm}^3$$

At Ravg:
$\Delta Q = U_j A_j\ t$
$\Delta V = 2\ hRR$ $$\frac{\Delta Q}{\Delta V} = \frac{240\ (0.314)\ (0.42/24)}{2\pi\ (14)\ (24)\ (1.0)}$$
$$= 6.25 \times 10^{-4}$$

At Rmin:
$\Delta Q = U_j A_j\ t$
$\Delta V = 2\ hRR$ $$\frac{\Delta Q}{\Delta V} = \frac{(120)\ (0.314)\ (0.42/24)}{2\pi\ (14)\ (12)\ (1.0)}$$
$$= 6.25 \times 10^{-4}$$

Overall:
$\Delta Q = 3.14$ $\Delta V = [(36)^2 - (12)^2]\ [14]$
$= 50668\ \text{mm}^3$ $$\frac{\Delta Q}{\Delta V} = 6.28 \times 10^{-4}$$

Simplified Example

The following is a simplified explanation of the logic of this example. $\Delta Q = U_j A_j \Delta t$ $\Delta Q$ is therefore linearly proportional to $U_j$ for each constant $\Delta t$ interval of time;

and the location of each of these $\Delta Q$s is also linearly proportional to $U_j$, since penetration of each droplet is equal to a constant times velocity ($L_p = $ constant $\times U_j$)

Assume $$\Delta t = \frac{1}{24}\ t$$

(which is a constant)

Assume uniformly falling velocity from $U_j$max of 360 m/sec to $U_j$min of 120 m/sec.

Thus, $$\frac{-\Delta U_j}{-t}$$

is constant, and since $\Delta Q$ for each $\Delta t$ is proportional to $U_j$, then $$-\frac{\Delta Q}{\Delta t}$$

is a constant.

Therefore, total $Q = U_j$ average times $A_j t$, and each $\Delta Q$ as a percent of the total Q will be $U_j/U_j$av. times $\Delta Q$ average.

$$\Delta Q\ \text{average} = \frac{1}{24}\ \text{total}\ Q$$

(i.e., $\Delta Q$ average = total $Q \times \Delta t$)

Since $U_j$ drops 10 meters per second during each $\Delta t$ in this example, $\Delta Q_1$ will be 355/240 times $\Delta Q$ average, or 355/240 times $$\frac{1}{24}\ Q,$$

or 6.34 percent of Q;

and the location of $\Delta Q_1$ will be proportional to Uj, and will be centered at 35 units out from the jet opening. $\Delta Q_{24}$ will be 125/240 times $\Delta Q$ average, or $$\frac{124}{240} \times \frac{1}{24} Q,$$

or 2.17 percent of Q;

and the location of $\Delta Q_{24}$ will be proportional to Uj, or will be centered at 12.5 units out from the jet opening.

In summary, using a model combustion chamber which is cylindrical with a constant depth, the combustion chamber volume is proportional to combustion chamber radius, while the fuel quantity per unit length of combustion chamber radius is also proportional to that radius, so that fuel quantity per unit volume is constant. Appropriate adjustment of spray hole diameter permits the penetration of maximum velocity spray to reach proximate Rmax and minimum velocity to reach proximate Rmin, resulting in substantial filling of the combustion chamber at peak engine power and speed.

Droplet Size

Droplet size is dependent primarily upon nozzle orifice size. It also depends upon injection pressure (which controls jet exit velocity) and ambient pressure. These relationships are well illustrated in FIGS. 27 and 28.

Figure 27:
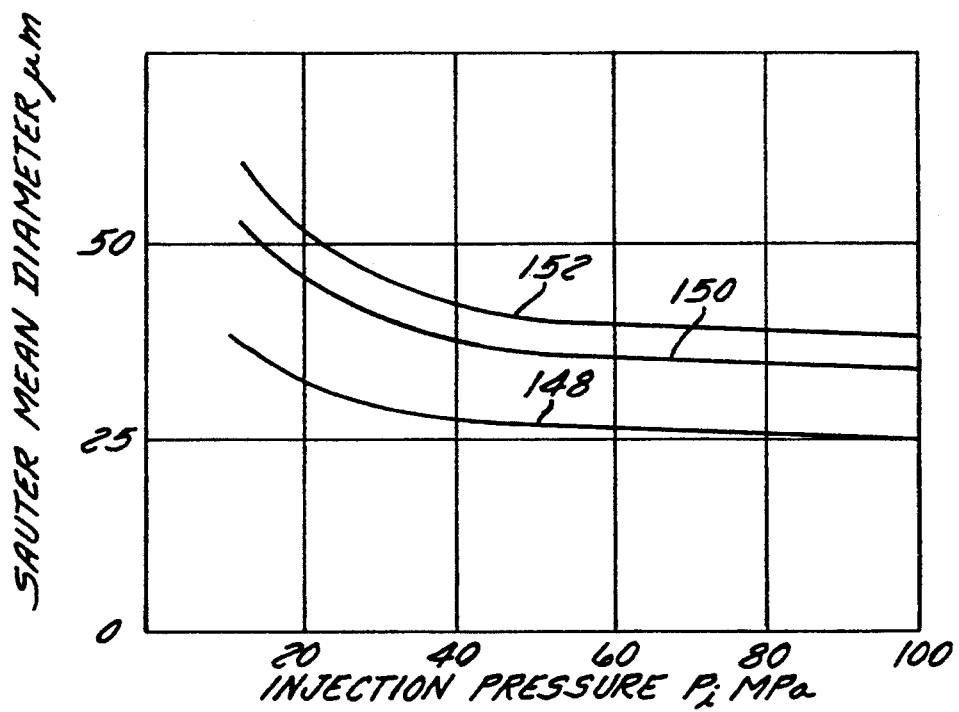
FIG. 27 is a graph plotting droplet Sauter Mean Diameter against injection pressure for three different jet orifice diameters.

Referring first to FIG. 27, Sauter Mean Diameter in micrometers or microns is plotted on the Y axis against injection pressure in megapascals on the X axis. Three curves are plotted, the lower one 148 for an orifice diameter of 0.1 millimeters, the next higher curve 150 for an orifice diameter of 0.3 millimeters, and the upper curve 152 for an orifice diameter of 0.4 millimeters. It will be seen that droplet size increases almost proportionally for this range of orifice diameters. It will also be seen from FIG. 27 that the droplet size commences to increase rapidly when injection pressure falls to around 10 megapascals, which corresponds to 1,500 psi, but that the droplet size does not vary drastically above about 20 megapascals, which corresponds to 3,000 psi. Since it is important to control droplet size both for the control of jet plume penetration length and the control of burning rate, applicant has selected a minimum injection pressure of 13.3 megapascals, which corresponds to 2,000 psi, with a corresponding minimum jet exit velocity of approximately 100 meters per second.

Figure 28:
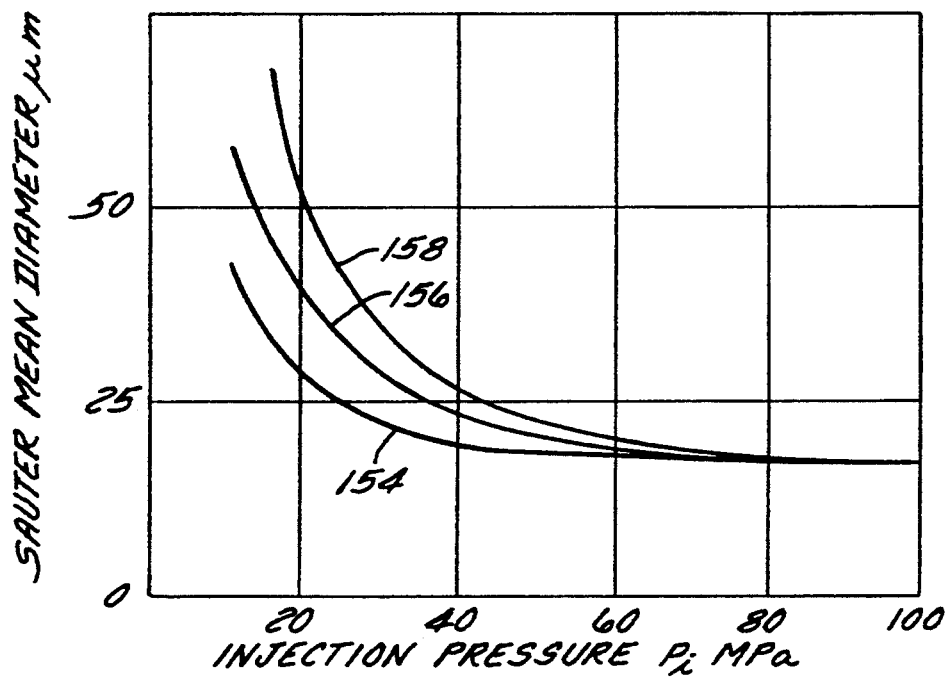
FIG. 28 is a graph similar to FIG. 27 but for a single orifice diameter and three different ambient pressures.

FIG. 28 is a plot of Sauter Mean Diameter in micrometers or microns on the Y axis against injection pressure in megapascals on the X axis for three different ambient pressures, the lower curve 154 being for 3.0 megapascals, which is 30 atmospheres, the middle curve 156 being for 1.0 megapascals or 10 atmospheres, and the upper curve 158 being for 0.1 megapascals or 1 atmosphere. Typically the compression pressure of a diesel engine will be on the order of 40 atmospheres, being approximately the compression ratio to the 1.4 power, which results from both the pressure of compression and the temperature rise of compression. Accordingly, the 30 atmospheres at which the lower curve 154 was taken is the most representative of the three curves for droplet size in a diesel engine, and at 40 atmospheres, the curve will be even flatter than the lower curve 154. Droplet size in FIG. 28 is given for a nozzle orifice of 0.3 millimeters. It is seen again in FIG. 28 that below 10 megapascals the droplet size rises rapidly.

The data forming the basis of the curves in FIGS. 27 and 28 was for diesel oil injection.

The data reflected in FIGS. 27 and 28 is helpful in selecting injection orifice diameter for a particular application.

Relationship Between Burning Time and Droplet Size

Figure 29:
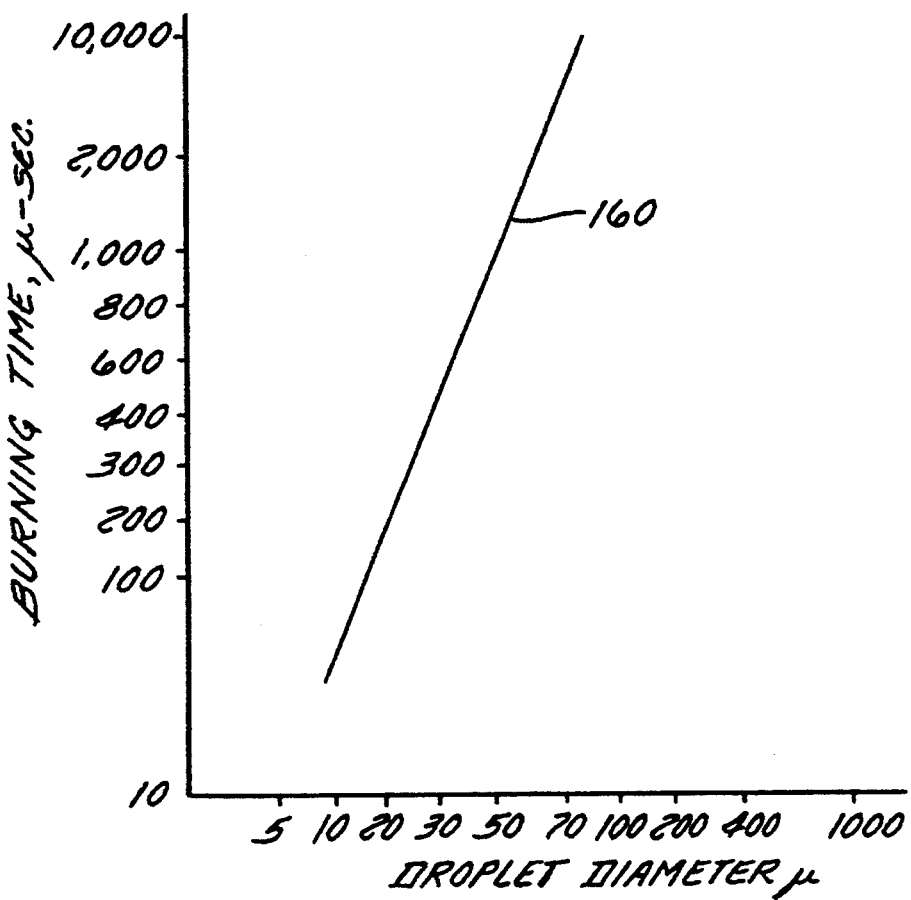
FIG. 29 is a graph comparing the burning time of diesel fuel with droplet diameter.

FIG. 29 compares the burning time of diesel fuel in microseconds on the Y axis with droplet diameter in microns on the X axis. From the straight-line plot 160 of FIG. 29, the burn time can be expressed by the formula $\Delta t_{bu} = 1000 \, (Dd/50)^2$ in microseconds, or $1.0 \, (Dd/50)^2$ in milliseconds, where Dd is the droplet diameter in microns.

This formula indicates that where 50 micron droplets are selected for the injection, based primarily upon orifice diameter selection, the burn time will be approximately 1 millisecond, which is a very good burning time for an engine of approximately 1 liter displacement, for example having a cylinder bore diameter of 102 millimeters and a stroke of 122 millimeters. This 1 millisecond burn time corresponds to a crank shaft rotation angle of 12° at 2,000 rpm, which is an ideal combustion duration. It is not so fast as to have excessive noise and pressures, and not so slow as to have late burning and soot and low thermal efficiency.

With the very short duration of the ECIS-FADS injection event, there will be very little vaporization of the fuel occurring during the injection event. This is for the reason that even with approximately 1000° C. of the compressed air in the cylinder, it is very unlikely that the droplets will reach higher than about 300° C. from going through the hot air, because the boiling heat of vaporization of the liquid will hold the temperature of the droplets approximately that low, and the fuel is very slow to vaporize at such relatively low temperatures. This is an important aspect of the ECIS-FADS system, because it means the droplets can be injected with only minimal vaporization during the injection, provided it is done much more rapidly than conventional injection, as it is with the ECIS-FADS system. To the contrary, with conventional injection, the time duration is so long that quite a large amount of the liquid droplets is enabled to vaporize even at the relatively low hot air temperatures in the cylinder.

However, the moment the flame starts, the flame temperature is on the order of about 1700° C., and the heat transfer becomes enormous, and droplet temperature becomes on the order of more than 500° C., controlled now only by the combustion chamber pressure because the droplets are boiling in a pressurized atmosphere. The burning rate is determined by the boiling rate, and the boiling rate is determined by the distribution of droplets which controls the location of the flame, and this distribution is substantially uniform throughout the combustion chamber with the ECIS-FADS system. Thus, the burn will be rapid and quite uniform with the ECIS-FADS-type injection.

It is preferred to have combustion start at the end of injection with the ECIS-FADS system, rather than during injection, because if combustion starts while injection is going on, the combustion process becomes complicated by putting fresh fuel into burnt gases, which causes undesirable combustion and exhaust emissions.

It is preferred to utilize compression ignition, which can be used for compression ratios over 12:1. However, if the compression ratio is less than 12:1, then spark assisted ignition of a pilot charge may be utilized, and such pilot charge would normally be injected around 40°–60° crank angle before top center. Such a spark-assisted pilot ignition system is disclosed in the Loyd U.S. Pat. No. 4,414,940. This is commonly referred to in the art as Conditioned Compression Ignition, or simply CCI. Burning of such a spark-ignited advance pilot charge raises the chemical reactivity in the combustion chamber to the point that compression ignition of the main charge will occur.

While it would appear from the Loyd patent that a pilot charge of more than 12 percent of the fuel was contemplated, applicant would prefer that it be only approximately 0.8–1.0 percent of the fuel charge, and that the pilot charge droplets be very small compared to the droplets of the main charge. With a 13.5:1 compression ratio, it takes approximately 1,000,000 50-micron droplets to give a full fuel charge of 73 cubic millimeters. If the pilot charge were of 10-micron drops, 1,000,000 of these would constitute only 1/125th of the fuel volume of the main charge, or 0.8 percent, leaving 99.2 percent for the main charge. By dispersing such pilot charge droplets as uniformly as possible in the combustion chamber, they will provide an excellent matrix of highly chemically reactive species upon being burned to assist compression ignition of the main charge. Droplets on the order of 10 microns in diameter vaporize extremely rapidly, and the fuel therein is virtually instantaneously burnable.

Such spark-assisted pilot injection for relatively low compression engines of course has the disadvantage of increased expense from the need for an added injector and the spark ignition source. However, it has the advantage of enabling compression to be relatively low, which then does not require that the engine be so strong.

Summarizing the combustion with the ECIS-FADS system, by injecting the fuel very, very fast close to top dead center, it will burn before it can be low temperature vaporized, and then the burning process is controlled entirely by the substantially uniform fuel/air distribution achieved with the ECIS-FADS injection, and by the temperature of the droplets that cannot exceed their boiling point at that pressure. The heat input to the droplets is then strictly from the flame, and that self-generates the boiling, with the boiling occurring at substantially constant temperature and providing a very controlled burning time.

It is preferred that the burning time be substantially longer than the duration of injection, and most preferably more than twice the duration of the injection. Then the burning cannot interfere with the injection, and the burning cannot proceed fast enough to keep the injection event from completing the substantially uniform fuel/air distribution of the ECIS-FADS system.

Length of Penetration, Lp

Three simplified, approximate equations I, II and III were given hereinabove for the penetration length of fuel increments, Lp. A fourth and more refined equation has been derived by applicant from experimental data and produces the same proportional relationship between Lp and injection velocity Uj for the fuel increments. This fourth equation is as follows:

$$\text{IV} \quad L_p = S_{bu} + S_{40}$$

Figure 30:
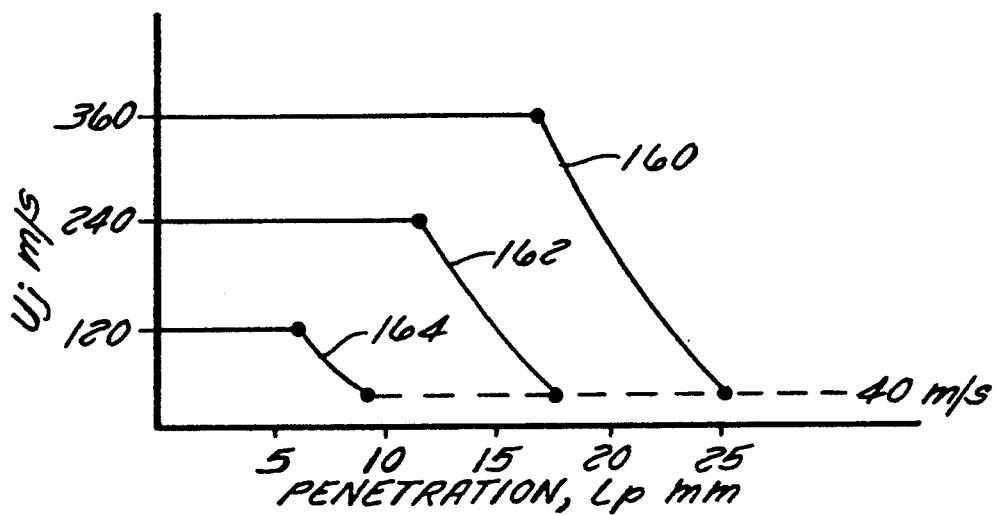
FIG. 30 has an upper portion showing a graph of droplet penetration relative to injection velocity, and a lower portion in axial section illustrating a combustion chamber configuration which, in association with the penetration distribution of the upper portion of the figure, will provide uniform air/fuel distribution in the combustion chamber.

In this equation:
$S_{bu}$ = breakup distance
$S_{40}$ = distance to 40 meters/sec.
$S_{bu} = C_1(V_0/400)15.8(P_1/P_a)0.5$
$S_{40} = C_2 D_d [8/3(P_1/P_a)] 1n(V_0/40)$
$V_0$ = initial jet exit velocity
$P_1$ = density of liquid fuel
$P_a$ = density of air in chamber
$C_1$ = calibration constant
$C_2$ = calibration constant
$D_d$ = diameter of droplet
$1_n$ = log base e FIG. 30 is a graph plotting droplet injection velocity Uj in meters per second on the Y axis and droplet penetration Lp in millimeters on the X axis. Curve 160 is for droplets injected at 360 meters per second, curve 162 is for droplets injected at 240 meters per second, and curve 164 is for droplets injected at 120 meters per second. The horizontal portions of curves 160, 162 and 164 represent the initial penetrations to breakup, and then the parallel exponential portions of the curves represent the rapid velocity decay after breakup. These curves are defined by formula IV above, and they are terminated at 40 meters per second at which point the droplets may be considered essentially stopped.

While the present invention has been described with regard to particular embodiments, it is to be understood that modifications may readily be made by those skilled in the art, and it is intended that the claims cover any such modifications which fall within the scope and spirit of the invention as set forth in the appended claims.

I claim:

1. A method comprising:
   injecting fuel from a fuel injector into a combustion cylinder of a stratified charge-type internal combustion engine at a velocity which falls rapidly and substantially continuously during an injection event after reaching an initial peak velocity, thereby forming an expanding cloud of atomized droplets with high positive separating velocities which expands substantially all along the path of injection.

2. A method as defined in claim 1, wherein said injection occurs such that a radial extent of said cloud is limited so that said cloud does not substantially wet a side wall of said combustion cylinder.

3. A method as defined in claim 2, wherein the percentage of fuel impinging on said side wall of said combustion cylinder is less than approximately 10%.

4. A method as defined in claim 3, wherein the percentage of fuel impinging on said side wall of said combustion cylinder is approximately 0.

5. A method as defined in claim 4, wherein said combustion cylinder presents a generally cylindrical bore of a diameter $D_{bore}$, and wherein an outer tip of said expanding cloud penetrates into said combustion cylinder to a maximum distance of less than 0.5 times $D_{bore}$.

6. A method as defined in claim 1, wherein said velocity decreases at more than 150,000 m/sec².

7. A method as defined in claim 6, wherein said velocity decreases at more than 600,000 m/sec².

8. A method comprising:
   (A) providing a stratified charge-type internal combustion engine having a combustion cylinder presenting a generally cylindrical bore of a diameter $D_{bore}$ and a cross-sectional area $A_{bore}$;

(B) providing an accumulator-type fuel injector having a plurality of injection holes in direct communication with said combustion cylinder, said injection holes presenting a cumulative cross-sectional area $A_{holes}$; and (C) injecting a maximum quantity $Q_{max}$ of fuel into said combustion cylinder from said fuel injector at approximately one atmosphere and at a velocity which falls rapidly and substantially continuously during the injection event after reaching an initial peak velocity, thereby forming an expanding cloud of atomized droplets with high positive separating velocities, wherein $Q_{max}/A_{holes}$ is less than approximately 1.6 $D_{bore}$.

9. A method as defined in claim 8, wherein $Q_{max}/A_{holes}$ is less than approximately 1.0 $D_{bore}$.

10. A method as defined in claim 8, wherein $A_{holes}/A_{bore}$ is less than approximately 1:10,000.

11. A method as defined in claim 8, further comprising commencing said injection event proximate a top dead center position of said combustion cylinder so as to substantially eliminate premixed burning of said fuel.

12. A method as defined in claim 8, wherein said velocity decreases at more than 150,000 m/sec².

13. A method as defined in claim 12, wherein said velocity decreases at more than 600,000 m/sec².

14. A method as defined in claim 8, wherein less than approximately 10 percent of the injected fuel is atomized and ready for burning at the end of the injection event.

15. A method as defined in claim 8, wherein a rate of change of the rate of falling velocity is less then approximately 50 percent.

16. A method as defined in claim 15, wherein a rate of change of the rate of falling velocity is less then approximately 5 percent.

17. A method comprising:

(A) providing a stratified charge-type internal combustion engine having a combustion cylinder presenting a generally cylindrical bore of a diameter $D_{bore}$ and a cross-sectional area $A_{bore}$;

(B) providing an accumulator-type fuel injector having a plurality of injection holes in direct communication with said combustion cylinder, said injection holes presenting a cumulative cross-sectional area $A_{holes}$; and (C) injecting a maximum quantity $Q_{max}$ of fuel into said combustion cylinder from said fuel injector at approximately one atmosphere and at a velocity which falls substantially continuously during the injection event at more than 150,000 m/sec² after reaching an initial peak velocity of 400 m/sec, thereby forming an expanding cloud of atomized fuel droplets with high positive separating velocities of more than 0.37 (m/sec)/mm, wherein said injection event begins closely proximate a top dead center position of said combustion cylinder, $Q_{max}/A_{holes}$ is less than approximately 1.6 $D_{bore}$, and $A_{holes}/A_{bore}$ is less than approximately 1:10,000.

* * * * *

UNITED STATES PATENT AND TRADEMARK OFFICE
CERTIFICATE OF CORRECTION

PATENT NO. : 5,392,745
DATED : February 28, 1995
INVENTOR(S) : Beck

It is certified that error appears in the above-indentified patent and that said Letters Patent is hereby corrected as shown below:

Col. 7, line 10, delete "Applicants' have" and substitute -- Applicant has --;
      line 12, delete "have" and substitute -- has --;

Col. 11, line 6, delete "0.800" and substitute -- -800 --;

Col. 14, line 46, delete "70" and substitute -- 7.0 --;

Col. 16, line 6, delete "2,000 psi";
      line 7, delete "and injection velocity of approximately";
      line 8, after the comma insert -- below which --;
      line 40, delete "milli-";
      line 41, delete "seconds" and substitute -- microseconds --;

Col. 21, line 34, delete "injctor" and substitute -- injector --;

Col. 32, line 8, delete "centr" and substitute -- center --.

Signed and Sealed this

Twenty-ninth Day of August, 1995

Attest:

BRUCE LEHMAN

*Attesting Officer*     *Commissioner of Patents and Trademarks*